United States Patent
Davidoff

(10) Patent No.: US 12,233,379 B2
(45) Date of Patent: *Feb. 25, 2025

(54) CARBON CAPTURE ADAPTER

(71) Applicant: Bentaus, LLC, Jacksonville, FL (US)

(72) Inventor: Robert Craig Davidoff, Southlake, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/442,021

(22) Filed: Feb. 14, 2024

(65) Prior Publication Data

US 2024/0181386 A1  Jun. 6, 2024

Related U.S. Application Data

(63) Continuation-in-part of application No. 18/368,567, filed on Sep. 14, 2023, which is a continuation-in-part of application No. 17/982,493, filed on Nov. 7, 2022, now Pat. No. 11,799,661.

(51) Int. Cl.
| | | |
|---|---|---|
| *B01D 53/14* | (2006.01) | |
| *B01D 45/16* | (2006.01) | |
| *B01D 53/30* | (2006.01) | |
| *B01D 53/32* | (2006.01) | |
| *B01D 53/62* | (2006.01) | |
| *B01D 53/78* | (2006.01) | |
| *G06Q 30/018* | (2023.01) | |

(52) U.S. Cl.
CPC .......... *B01D 53/326* (2013.01); *B01D 45/16* (2013.01); *B01D 53/1475* (2013.01); *B01D 53/30* (2013.01); *B01D 53/62* (2013.01); *B01D 53/78* (2013.01); *G06Q 30/018* (2013.01); *B01D 2257/504* (2013.01); *B01D 2258/06* (2013.01)

(58) Field of Classification Search
CPC .. B01D 45/16; B01D 53/1475; B01D 53/326; B01D 53/30; B01D 53/62; B01D 53/78; B01D 2257/504; B01D 2258/06; G06Q 30/018
USPC .......... 423/220, 228, 229; 95/151, 195, 205, 95/206, 214, 219, 236; 96/243
See application file for complete search history.

(56) References Cited

U.S. PATENT DOCUMENTS

| | | | | |
|---|---|---|---|---|
| 3,656,276 A | * | 4/1972 | Vind ................. | B01D 19/0042 95/172 |
| 4,834,782 A | * | 5/1989 | Silva .................. | B01F 23/29 422/606 |

(Continued)

*Primary Examiner* — Frank M Lawrence, Jr.
(74) *Attorney, Agent, or Firm* — Wilson Dutra, PLLC; Camille A. Wilson

(57) ABSTRACT

The present disclosure relates to a carbon capture adapter that may attach to high air flow locations. A carbon capture adapter may utilize the air flow of a high air flow location to allow for capture of unfiltered air, allowing for carbon removal and the scrubbing of the unfiltered air. The carbon capture adapter may comprise carbon sensors that may detect carbon levels of the air before and after the carbon has been scrubbed or removed from the ambient air. The carbon capture adapter may capture and transform the carbon into secondary substances that may be useful unto itself. The carbon capture adapter will have all inputs, outputs, processes, and flows that meet all aspects of a closed loop system that is specifically designed for CCS. The carbon capture adapter may be at least temporarily secured to at least one portion of a vehicle.

15 Claims, 22 Drawing Sheets

(56) References Cited

U.S. PATENT DOCUMENTS

| | | | |
|---|---|---|---|
| 6,284,023 B1 * | 9/2001 | Torkildsen | B01D 53/1456 |
| | | | 95/216 |
| 6,667,171 B2 | 12/2003 | Bayless | |
| 7,018,451 B1 * | 3/2006 | Torkildsen | B01F 25/433 |
| | | | 95/216 |
| 7,708,806 B2 | 5/2010 | Wright | |
| 8,329,458 B2 | 12/2012 | Parent | |
| 8,685,153 B2 | 4/2014 | McKenna | |
| 10,099,176 B2 | 10/2018 | Ateya Soliman | |
| 2015/0251129 A1 * | 9/2015 | Heirman | B01D 53/80 |
| | | | 95/190 |
| 2024/0050891 A1 * | 2/2024 | Zemek | B01D 53/1475 |

* cited by examiner

1200

1200

1200

1200

1700

```
┌─────────────────────────────────────────────────────────────────┐
│                      RECEIVE AIRFLOW                            │
│                                                          1705   │
└─────────────────────────────────────────────────────────────────┘
                              ▼
┌─────────────────────────────────────────────────────────────────┐
│         PULL AIR THROUGH AT LEAST ONE CYCLONE SEPARATOR         │
│                                                          1710   │
└─────────────────────────────────────────────────────────────────┘
                              ▼
┌─────────────────────────────────────────────────────────────────┐
│       DIRECT AIR THROUGH AT LEAST ONE MECHANICAL FILTERING      │
│                            MECHANISM                            │
│                                                          1715   │
└─────────────────────────────────────────────────────────────────┘
                              ▼
┌─────────────────────────────────────────────────────────────────┐
│   DIRECT AIR TO A FIRST CONTAINER PORTION AND THROUGH AT LEAST  │
│       ONE VENTURI TUBE TO AT LEAST ONE AQUEOUS SOLUTION         │
│                                                          1720   │
└─────────────────────────────────────────────────────────────────┘
                              ▼
┌─────────────────────────────────────────────────────────────────┐
│     CIRCULATE AQUEOUS SOLUTION VIA AN APPLIED AMOUNT OF         │
│                     CENTRIFUGAL FORCE                           │
│                                                          1725   │
└─────────────────────────────────────────────────────────────────┘
                              ▼
┌─────────────────────────────────────────────────────────────────┐
│   INTRODUCE OUTER PORTION OF AQUEOUS SOLUTION TO AT LEAST ONE   │
│                    HYDROCYCLONE SEPARATOR                       │
│                                                          1730   │
└─────────────────────────────────────────────────────────────────┘
                              ▼
┌─────────────────────────────────────────────────────────────────┐
│   DIRECT INTERNAL PORTION OF AQUEOUS SOLUTION TO AT LEAST ONE   │
│      WET SCRUBBER WITHIN A SECOND CONTAINER PORTION    1735     │
└─────────────────────────────────────────────────────────────────┘
                              ▼
┌─────────────────────────────────────────────────────────────────┐
│   DIRECT AQUEOUS SOLUTION FROM HYDROCYCLONE SEPARATOR TO AT     │
│                    LEAST ONE CARBON SINK               1740     │
└─────────────────────────────────────────────────────────────────┘
                              ▼
┌─────────────────────────────────────────────────────────────────┐
│  EXPOSE AT LEAST ONE PORTION OF THE AQUEOUS SOLUTION TO ONE     │
│           OR MORE HIGH-PRESSURE HOMOGENIZERS                    │
│                                                          1742   │
└─────────────────────────────────────────────────────────────────┘
                              ▼
┌─────────────────────────────────────────────────────────────────┐
│    DIRECT AIR FROM CARBON SINK THROUGH AT LEAST ONE MIST        │
│   ELIMINATOR AND/OR AT LEAST ONE ADSORPTION FILTERING    1745   │
│                         MECHANISM                               │
└─────────────────────────────────────────────────────────────────┘
                              ▼
┌─────────────────────────────────────────────────────────────────┐
│  APPLY ELECTRICITY TO AQUEOUS SOLUTION TO FACILITATE AT LEAST   │
│                ONE ELECTROCHEMICAL REACTION              1750   │
└─────────────────────────────────────────────────────────────────┘
```

FIG. 17

CARBON CAPTURE ADAPTER

CROSS-REFERENCE TO RELATED APPLICATION

This application is a continuation in part of and claims priority to U.S. Non-provisional patent application Ser. No. 18/368,567 (filed Sep. 14, 2023, and titled "CARBON CAPTURE ADAPTER"), which claimed priority to and the full benefit of U.S. Non-provisional patent application Ser. No. 17/982,493 (filed Nov. 7, 2022, and titled "CARBON CAPTURE ADAPTER"), the entire contents of which are incorporated herein by reference.

BACKGROUND

In 1938, scientists connected the Earth's increase of carbon dioxide ($CO_2$) in the atmosphere to global warming. While the process of $CO_2$ and water vapor trapping heat in the atmosphere was already understood, it was not until the 20th century that scientists discovered the threat of an increase in $CO_2$ emissions, with these long-term shifts in weather and temperature patterns coined "climate change." Climate change has become a widely discussed issue in the 21st century.

Compounding the concerns about climate change, as of 2022, there are 287 million registered cars in the United States alone that are regularly driven on highways and road systems. Estimates suggest that there are over 1 billion cars registered worldwide. According to data from the International Energy Association ("IEA") and the Environmental Protection Agency ("EPA"), vehicles and the transportation industry as a whole account for approximately 24-28% of the total $CO_2$ emissions of the United States. The data suggests that gas-powered cars, even with mandated requirements for low emissions and the inclusion of catalytic converters, still emit a large amount of carbon into the atmosphere every year.

In light of the foregoing concerns, new technologies are being developed that include ways to produce clean and/or green energy. Specifically, Carbon Capture and Storage (CCS) technologies have played an integral role in reducing carbon emissions.

Typically, CCS is applied to industrial processes where $CO_2$ is compressed and transported through pipelines to be stored in deep underground rock formations or for enhanced oil recovery EOR. This is used to mitigate the amount of $CO_2$ emitted from the burning of fossil fuels and similar $CO_2$ producing processes. Outside of these industrial applications, Carbon Capture innovators have looked towards obtaining the $CO_2$ from the air itself through direct air carbon capture (DACC). These massive air capture and storage plants assist in removing $CO_2$ from the air on a large-scale. Unlike the CSS applied to fossil fuel burning, these new $CO_2$ capture technologies do more than reduce the amount of $CO_2$ released by certain activities, rather they reduce the total amount of $CO_2$ in the atmosphere by the actual removal of $CO_2$ or $CO_2e$.

Still, these new air capture technologies require a source of high velocity air flow. Using large air turbines, industrial fans, and contactors, companies have found ways to extract the $CO_2$ from the atmosphere to then concentrate it for capture and storage. This has the effect of reducing the amount of $CO_2$ in the atmosphere while also providing revenue for these companies in the form of carbon credits. Corporations can then purchase these carbon credits to earn the right to emit a certain amount of $CO_2$ according to regulatory requirements or choose to become carbon neutral or net zero.

While these air capture technologies exist in large industrial settings and are expanding into these standalone facilities, there are many other sources of $CO_2$ emissions that are being ignored by these inventions. For example, even though datacenters and crypto mining assets in general do not emit carbon such as a gas-powered vehicle, the energy source itself, known as the scope 2 emissions, of datacenters of artificial intelligence and the mining of crypto assets or any other high performance computing (HPC) generated approximately 0.4% to 0.8% of the United States greenhouse gas emissions if that source is from coal and other fossil fuel sources. These large datacenters for HPC such as AI, and crypto-mining machines are ignored by CCS technologies, their energy source emissions freely entering the atmosphere. This is the case for many activities and practices that people do not typically associate with $CO_2$ emissions meaning that many non-producing $CO_2$ industries, or industries that may consume energy sources that release $CO_2$ in the atmosphere have the opportunity to actually reverse the process through DACC and CCS.

The difficulty for CCS and other air capture technologies is discovering a method of $CO_2$ extraction that is both profitable and workable in these more unique $CO_2$ producing environments. Current mechanisms are either too large and/or expensive to work in these conditions. Rather, they need a more adaptable and practical process, one that has yet to have been developed to have the process, flows, and adaptation to finally deliver the economics of scale that is needed in the CCS industry and to productize everyday use of the technology.

SUMMARY OF THE DISCLOSURE

Accordingly, the present disclosure relates to a carbon capture adapter that may attach to high air flow systems or that may be configured at high air flow locations. A carbon capture adapter may take advantage of high air flow locations to allow for effective and efficient capture of unfiltered air, allowing for carbon scrubbing of the unfiltered air. In some embodiments, the carbon capture adapter may comprise sensors that may detect carbon levels of the air before and after the carbon has been scrubbed from the air. In some aspects, the carbon capture adapter may capture and transform the carbon into a secondary substance that may be useful unto itself for utilization also known as carbon capture utilization storage (CCUS), even further limiting waste and environmental damage. This carbon capture adapter may be used standalone or integrated into existing machines, devices, or structures to facilitate personal or industrial use in a wide variety of use applications.

BRIEF DESCRIPTION OF THE DRAWINGS

The accompanying drawings that are incorporated in and constitute a part of this specification illustrate several embodiments of the disclosure and, together with the description, serve to explain the principles of the disclosure:

FIG. 17 illustrates an exemplary method for carbon capture using a carbon capture adapter, according to some embodiments of the present disclosure.

DETAILED DESCRIPTION

The present disclosure provides generally for an innovative and more effective way to remove carbon from the air, allowing for the scrubbing and air purification in reference to this also includes the management of high carbon-emitting machinery or any ambient air that carbon may be removed from. According to the present disclosure, a carbon capture adapter may attach to high flow air systems and remove a portion of the carbon from the ambient air.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

High Air Flow System: as used herein refers to any carbon delivery device that provides ambient unfiltered air to a carbon capture adapter.

Air flow or Airflow: as used herein refers to the flow of a carbon-carrying gas or liquid, wherein carbon may be captured and scrubbed from the airflow through the carbon capture adapter. Typically referred to as air, for case of reference, but does not exclude the process of moving high volume liquids.

Figure 1:
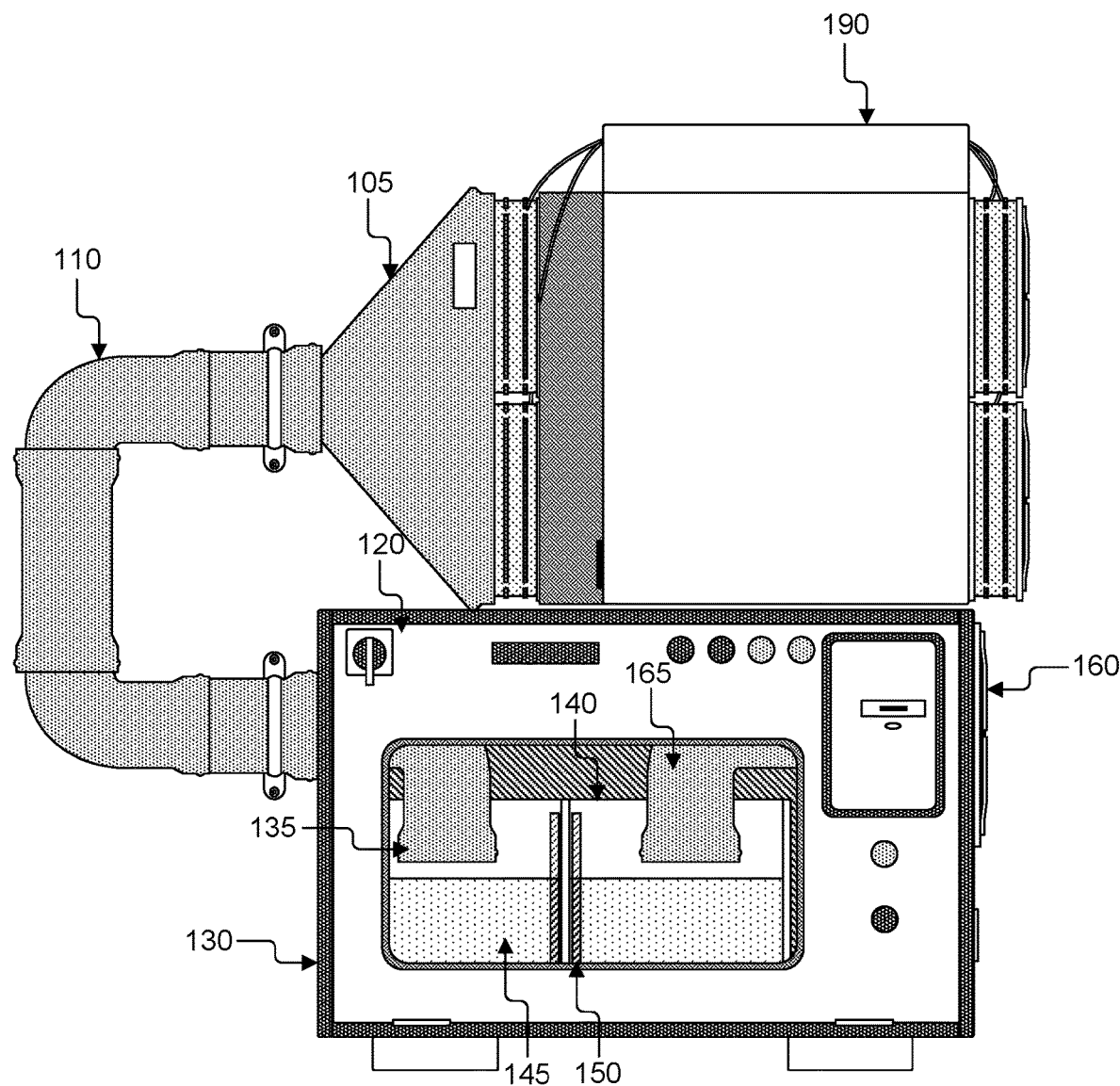
FIG. 1 illustrates an exemplary carbon capture adapter attached to a high air flow system, according to some embodiments of the present disclosure.

Referring now to FIG. 1, an exemplary carbon capture adapter 100 is illustrated, wherein the carbon capture adapter 100 is connected to the air output portion of a high air flow system 190. In some aspects, a collection portion 105 may attach to a high air flow system 190. In some embodiments, a closed loop controller system 110 may be connected to the collection portion 105, wherein the ambient or polluted air received through the collection portion flows through the closed loop controller system 110.

In some aspects, the carbon capture adapter 100 may comprise a carbon filtering system 120. In some implementations, the carbon filtering system 120 may comprise a container portion 130 comprising a first opening 135 and a second opening 165, wherein the first opening is connectable to the closed loop controller system 110, wherein ambient or polluted air received through the closed loop controller system 110 flows through the first opening 135 into the container portion 130.

In some embodiments, the carbon capture adapter 100 may comprise a multi-staged carbon sink 140 located within the container portion 130, the first carbon sink 140 configured to contain a replaceable substance 145 that may be in an aqueous solution that will create a chemical reaction to bind with carbon as the ambient or polluted air is received from the closed loop controller system 110 to create a first captured carbon substance and filtration of carbon of the ambient or polluted air as the exhaust or byproduct herein referred to as filtered air. In some implementations, the carbon filtering system 120 may comprise a removable filter 150 located within the multi-staged sink 140, wherein the filter 150 collects the first captured carbon substance; and an exit air system 160 connectable to the second opening 165, wherein the filtered air exits the carbon filtering system 120 through the second opening 165 and the exit air system 160.

Figure 2:
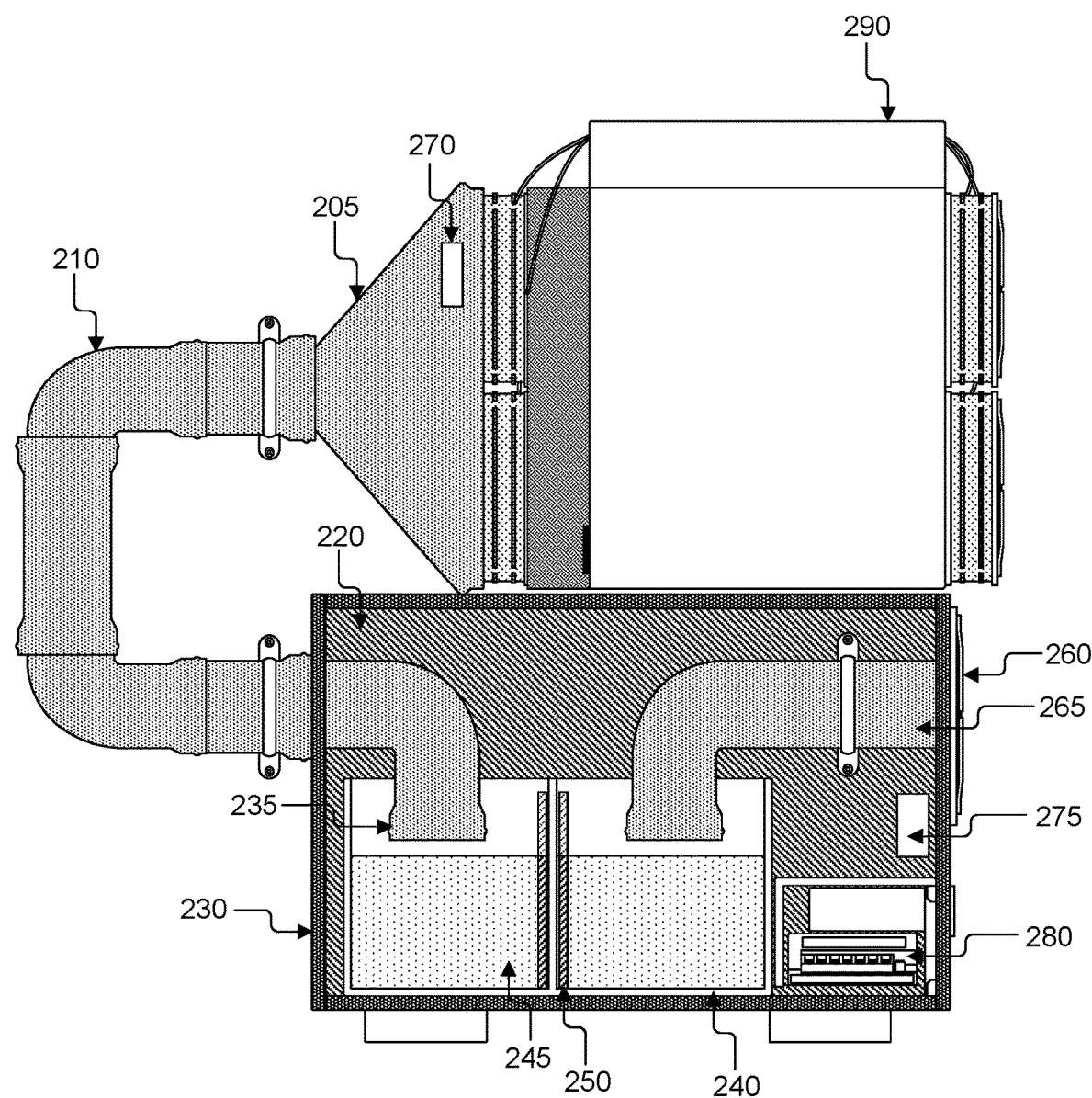
FIG. 2 illustrates an exemplary carbon capture adapter attached to a high air flow system, according to some embodiments of the present disclosure.

Referring now to FIG. 2, an exemplary carbon capture adapter 200 attached to a high air flow 290 system is illustrated. In some embodiments, an input sensor 270 may be located proximate to ambient, unfiltered, or polluted air, wherein the input sensor 270 detects the carbon level in the ambient, unfiltered, or polluted air received through the closed loop controller system 210.

In some implementations, an output sensor 275 may be located proximate to the second opening 265, wherein the output sensor, once completing the removal of carbon from the ambient, unfiltered, or polluted air, in a closed loop system detects a filtered carbon level in the filtered air received through the carbon capturing system. In some aspects, the output sensor 270 may periodically collect the unfiltered carbon level and transmit the unfiltered carbon level to the carbon data controller 280, and the carbon data controller 280 may compare the filtered carbon level to the unfiltered carbon level to calculate carbon removal data. This use of this data will allow for amplification, feedback, monitoring, error logging all critical to the performance of a closed loop system.

The closed loop carbon capture adapter 200 may be used as an adapter, connectable to existing applications, or may become a standalone device. As an adapter, the carbon capture adapter 200 may scrub and capture carbon on everyday life devices as an accessory. As a standalone device, the carbon capture adapter 200 may comprise of and act solely as an independent carbon air purifier by means of adding a high-volume fan, turbine, blower, or centrifugal device for passive air movement of ambient air to enter into the closed loop system through connecting to 270 the adapter. The adapter may connect to any device that exhausts or pushes a volume of air through a chamber, exhaust, ventilation system, ambient air, or an apparatus.

This measurement of air, or air flow or volume of air passed through a device or system, such as a fan, is typically measured in units called CFM. The adapter may create a closed loop controller system 210 that may have the capability to measure the input and net output of carbon through the process, thus capturing a net carbon delta change from the air and removal of carbon dioxide and/or carbon monoxide from the air and exchanging it into a solid and/or liquid form. The measurement of carbon in air through the sensor is typically calculated in parts per million (ppm) or and may be used as the unit of measurement in calculating the delta change in carbon from the ambient air (input) to the filtered air (output).

By providing a reference point and feedback of output using carbon sensors 270, 275, parts of the process may be more effectively monitored and managed to create an efficient system. As non-limiting examples, data collected from the carbon sensors 270, 275 may influence fan speed, concentration of solution, electrolysis, and flow rate. Monitoring error codes through a carbon data controller 280, such as a controller, that takes the data from the carbon sensors 270, 275 to adjust a process to get the desired result of carbon capture creates a closed loop carbon capture adapter 200 that may be used standalone or attached to add onto an existing process.

The unfiltered air sensor 270 may calculate the amount of carbon in common quantitative measurements that is about to pass through the carbon capture adapter 200. It may measure the amount of carbon being passed through the carbon filtering system 220. As non-limiting examples, carbon sensors may comprise one or more of NDIR, mercury manometer, IR gas analyzer, IR gas, photoacoustic spectroscopy devices, or microelectromechanical system.

Figure 3:
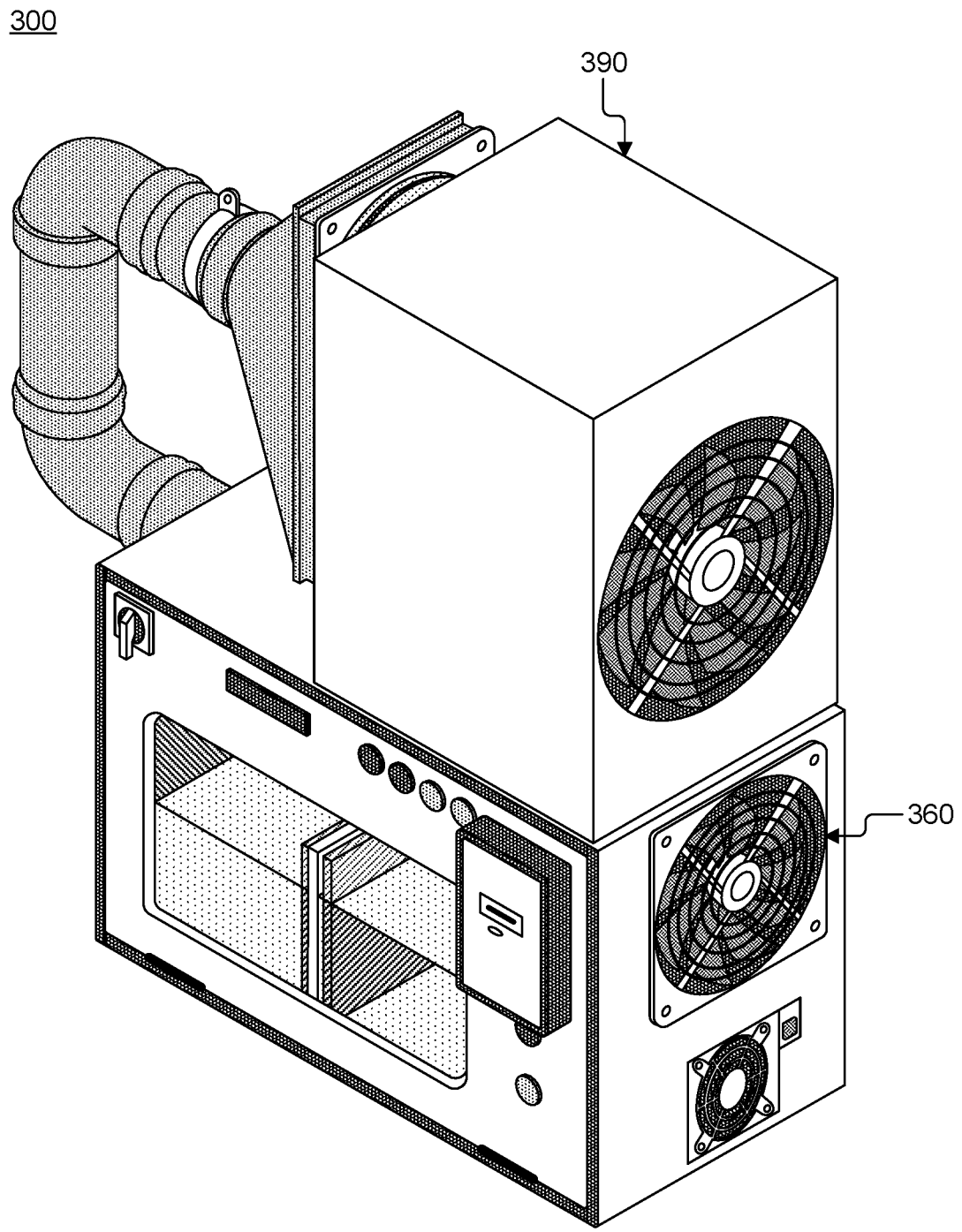
FIG. 3 illustrates an exemplary carbon capture adapter attached to a high air flow system, according to some embodiments of the present disclosure.

Referring now to FIG. 3, an exemplary carbon capture adapter 300 attached to a high air flow system 390 is illustrated. In some embodiments, the origin of input may be the primary part and start of the process. In some aspects, collection may occur through a carbon capture adapter 300, which may be connected to the original high air flow system. Any output of air volume the carbon capture adapter 300 may be plugged and connected to the high air flow system that may be pre-existing. If there is no device to attach the carbon capture adapter 300 to, the carbon capture adapter 300 itself may comprise a high-volume CFM fan and becomes the primary source and an instant carbon catcher.

Figure 4:
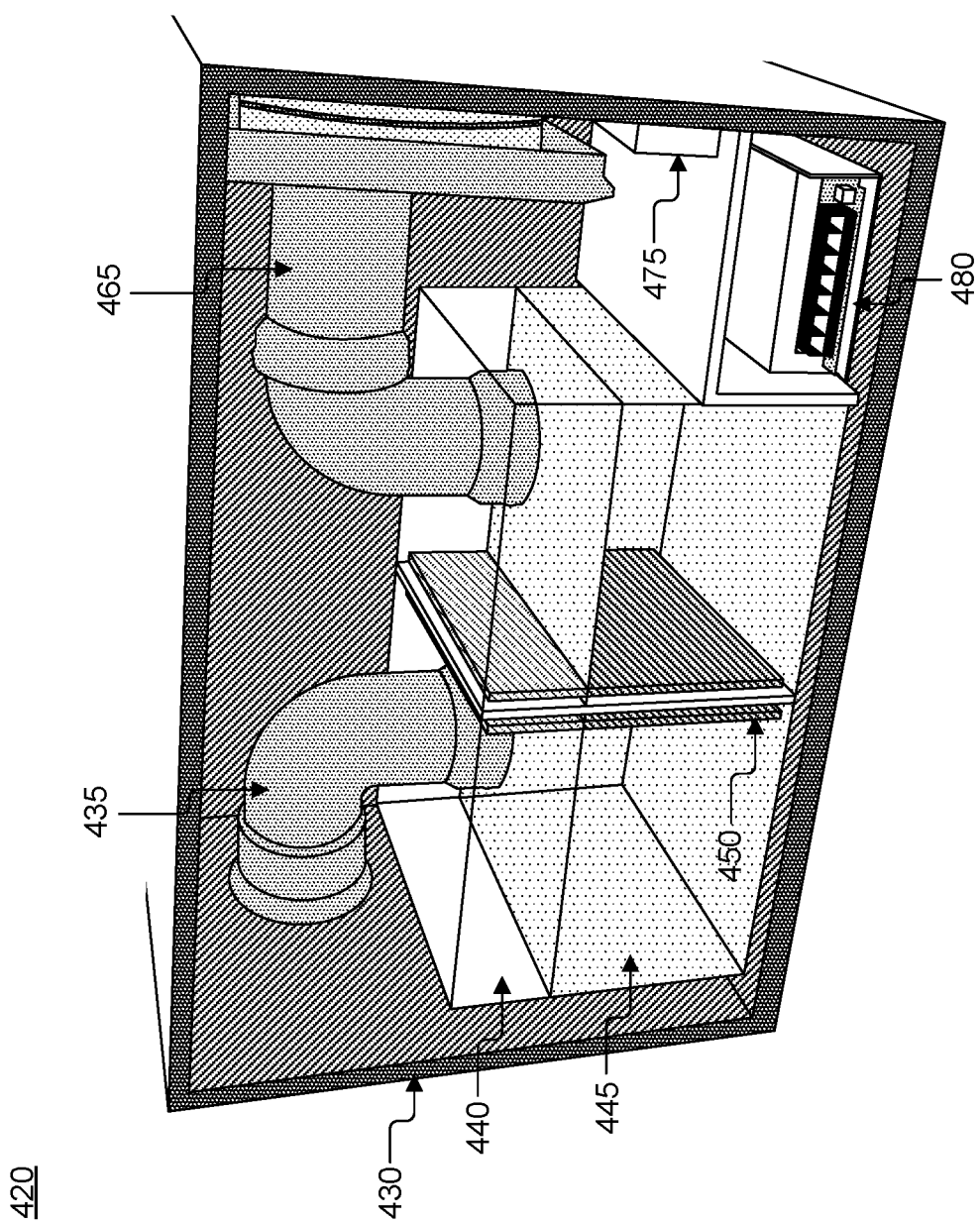
FIG. 4 illustrates an exemplary carbon filtering system for a carbon capture adapter, according to some embodiments of the present disclosure.

Referring now to FIG. 4, an exemplary carbon filtering system 420 of a carbon capture adapter is illustrated. In some aspects, the carbon capture adapter may comprise a carbon filtering system 420. In some implementations, the carbon filtering system 420 may comprise a container portion 430 comprising a first opening 435 and a second opening 465, wherein the first opening is connectable to the closed loop controller system, wherein unfiltered air received through the closed loop controller system flows through the first opening 435 into the container portion 430.

In some embodiments, the carbon capture adapter 400 may comprise a first sink 440 located within the container portion 430, the first sink 440 may be configured to contain a replaceable substance 445 to bind with carbon in the unfiltered air received from the closed loop controller system 410 to create a first captured carbon substance and filtered air. In some implementations, the carbon filtering system 420 may comprise a removable filter 450 located within the first sink 440, wherein the filter 450 collects the first captured carbon substance; and an exit air system 460 connectable to the second opening 465, wherein the filtered air exits the carbon filtering system 420 through the second opening 465 and the exit air system 460.

In some aspects, an exchange of carbon may occur within the first sink, such as through a chemical reaction through filtration or electrolysis. In some embodiments, the air may be mixed against an aqueous solution that may contain one or more compounds, such as, for example and not limitation. alkali metals that may have an absorbent result. The next step may occur through chemical reaction, bonding/binding, electrolysis, electrochemical, or absorption, as non-limiting examples. In some implementations, a filter or absorber may attract and remove the carbon from the air and direct the carbon into a liquid or solid state. As non-limiting examples, the aqueous solution may comprise a hydroxide, such as potassium hydroxide, lithium hydroxide, or sodium hydroxide.

In some aspects, one or more of: heat, electrochemical, or electrolysis may remove the carbon from the air, liquid, and/or solid state to be further contained. The electrochemical process of ionization using fluids to aid, enhance, accelerate, or be the primary mechanism to create an isolation and bonding result that will attract the carbon molecule to bond and go through a medium exchange process from one state to another. Heat or electrolysis may be used in combination or separate instances to isolate the captured carbon. In some embodiments, the replaceable substance 445 may comprise a liquid that may cause algae growth.

By injecting carbon, such as carbon dioxide, into a liquid, such as water, an organic path and natural process of photosynthesis may allow carbon to be stored in its solid form and facilitate the growth of algae. In some implementations, the filter 450 may comprise microbes. For example, a microbe may be designed so that once the carbon dioxide is now in its liquid form would allow a microbe to consume the carbon dioxide. As non-limiting examples, a filter 450 may comprise a sponge, honeycomb, matrix, tubes, that may store the carbon for future extraction. This will allow for replacement of the medium itself such as a replacement filter.

In some aspects, a first sink 440 may comprise a holding tank or provide the volume or area where the reaction may occur. The first sink 440 is a plotter to allow for the filter/absorber to capture the carbon from the reaction and when the medium and carbon transfer take place to move from the state of air to the physical solid state. This may be where the aqueous solution resides in a holding tank area. The carbon may be in its solid or liquid form or inside a living organism such as algae or microbes.

In some aspects, a filtered air sensor 475 may monitor the output of the carbon for the desired result. This may measure the exhaust or output of the air for the desired result and provide feedback. In the closed loop version, this sensor 475 acts as the feedback loop that can report to the carbon capture controller 480. This feedback data may be used as amplification or suppression of the carbon capture process thus creating components of a closed loop system.

In some embodiments, an extraction process of the carbon may use heat, electrolysis, electrochemical, or other separation techniques to remove the carbon from the medium such as a filter or the carbon sink itself. The heat may be in the form of a boiler or heat exchanger, wherein use of steam may facilitate in the extraction process. This may be an additional process. Wasted heat from the carbon emitter device such as but not limiting to the heat created from a bitcoin mining device or other manufacturing process may be captured to help in the sequestering process. For example, carbon may be separated from the aqueous solution, which may be considered an additional process to move carbon dioxide from its solid or liquid form and isolated back into its gaseous state. The carbon may also stay within its sequestered liquid or solid form without the added process to be utilized for commercial activities such as fertilizers, soaps, or detergents, as non-limiting examples. As another example, the resulting compound may have secondary purpose, such as Potassium Bicarbonate, Lithium bicarbonate, Sodium Bicarbonate, which may be extracted from a filter 450 and repurposed. As a still further example, the algae or microbes may be extracted. Carbon sequestering allows for the actual mining, and removal of the carbon after a period of time or replacement of filters or replacement of aqueous solution.

In some embodiments a carbon data controller 480 may take the input of the input sensor, take the input of the output sensor 475, and take the delta of the PPMs from both sensors to see the change in carbon. This may give a measurement of the actual carbon that has been scrubbed or captured from the carbon capture process. By measuring the data of carbon coming in the system and out of the system, carbon credits may be quantified and objectively measured. This data may be sent to other systems in the future for carbon credit exchanges and to accurately reflect carbon capture data in real time. This will allow for integration into other processes and systems at any point in the process.

In some aspects, the carbon data controller 480 may be the primary controller and may comprise a controller board for the carbon capture adapter. The carbon data controller 480 may have the capability to have firmware, data storage, memory, IDE, interfaces, input and output peripheral, and software application programmer interface API integration to be able to send the carbon capturing data in real time to other systems and also store a history of carbon capture this controller board monitored, sent, and received data from.

In some implementations, the carbon data controller 480 may rely on a process flow of conditions based on predefined criteria of input or reference, amplifier, controller, process, and feedback, as non-limiting examples. This process flow may provide feedback for a predefined result. The system may have one or more feedback loops between its output and input carbon sensors 475 receiving and transmitting data through the controller board. The closed-loop control system design will provide amplification or suppression automatically to provide the desired output of carbon by comparing it with the actual input of carbon and adjusting the process to parameters that may be set or learned over time, such as, for example and not limitation, via machine learning, deep learning, or artificial intelligence, to create an optimal reliable apparatus for CCS.

Figure 5:
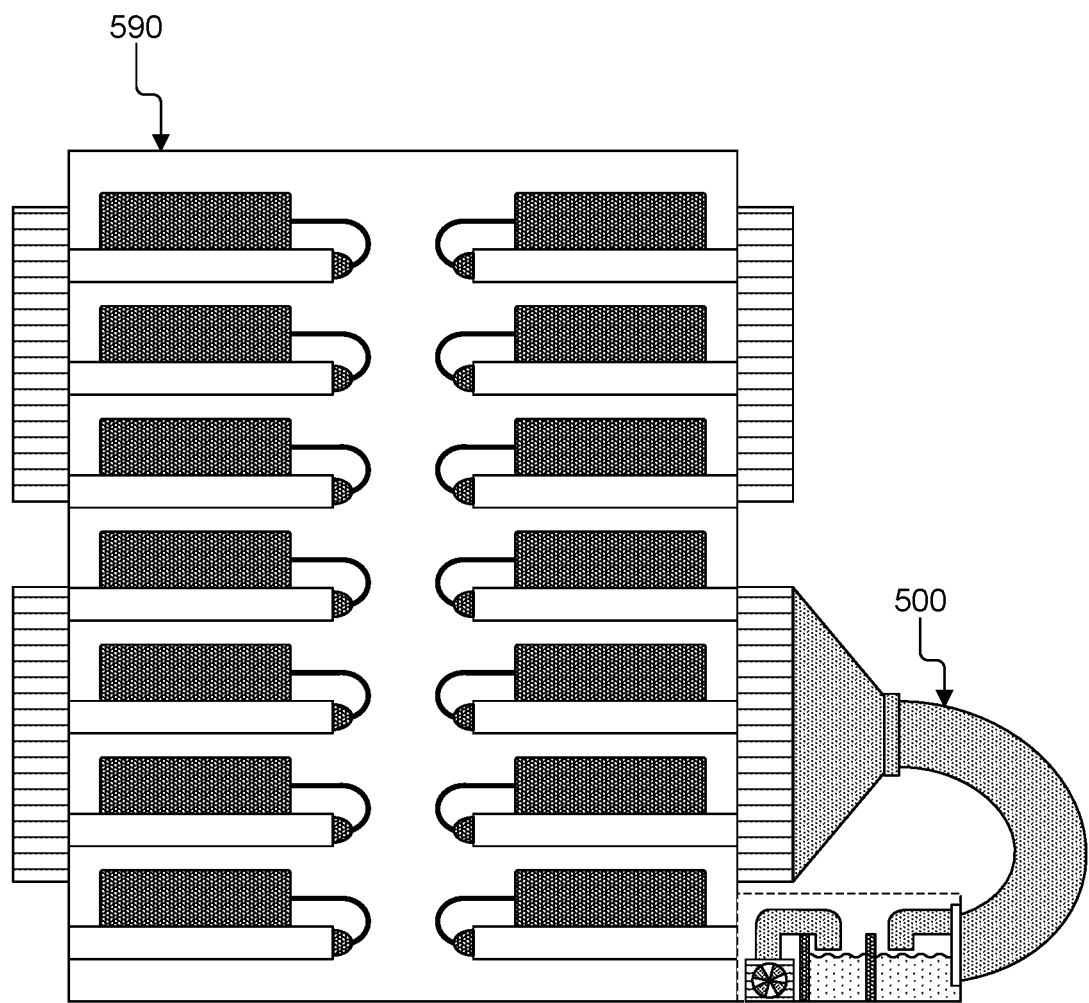
FIG. 5 illustrates an exemplary carbon capture adapter attached to a high air flow system, according to some embodiments of the present disclosure.

Referring now to FIG. 5, an exemplary carbon capture adapter 500 attached to a high air flow system 590 is illustrated. In some aspects, a high air flow system 590 may comprise a bitcoin mining container, which may contain multiple bitcoin miners in a single room or vessel or containment. In some embodiments, the high airflow system 590 may comprise a bitcoin farm or datacenter, where large amounts of data are stored and processed, emitting large amounts of airflow. This airflow used to control the ambient temperature of the miner's adapter may be attached to the output to then integrate the process of CCS.

Figure 6:
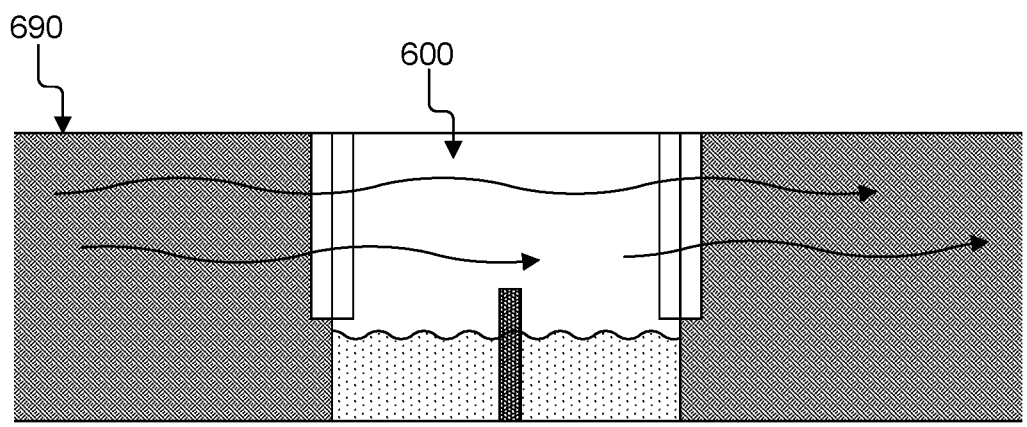
FIG. 6 illustrates an exemplary carbon filtering system attached to a high air flow system, according to some embodiments of the present disclosure.

Referring now to FIG. 6, an exemplary carbon capture adapter 600 attached to a high air flow system 690 is illustrated. In some embodiments, the high air flow system 690 may comprise ducting or tubing within a larger airflow system. This may allow for the insertion of the carbon capture adapter 600 inline with an inline carbon scrubber, filter, ducting or tubing system. For example, a carbon capture adapter 600 may be inserted inline with air conditioning ducting within a home or commercial building, as a way to remove carbon from the air. This may allow for carbon capture to become more accessible to individuals and companies that may not invest in large carbon scrubbing facilities.

Figure 7:
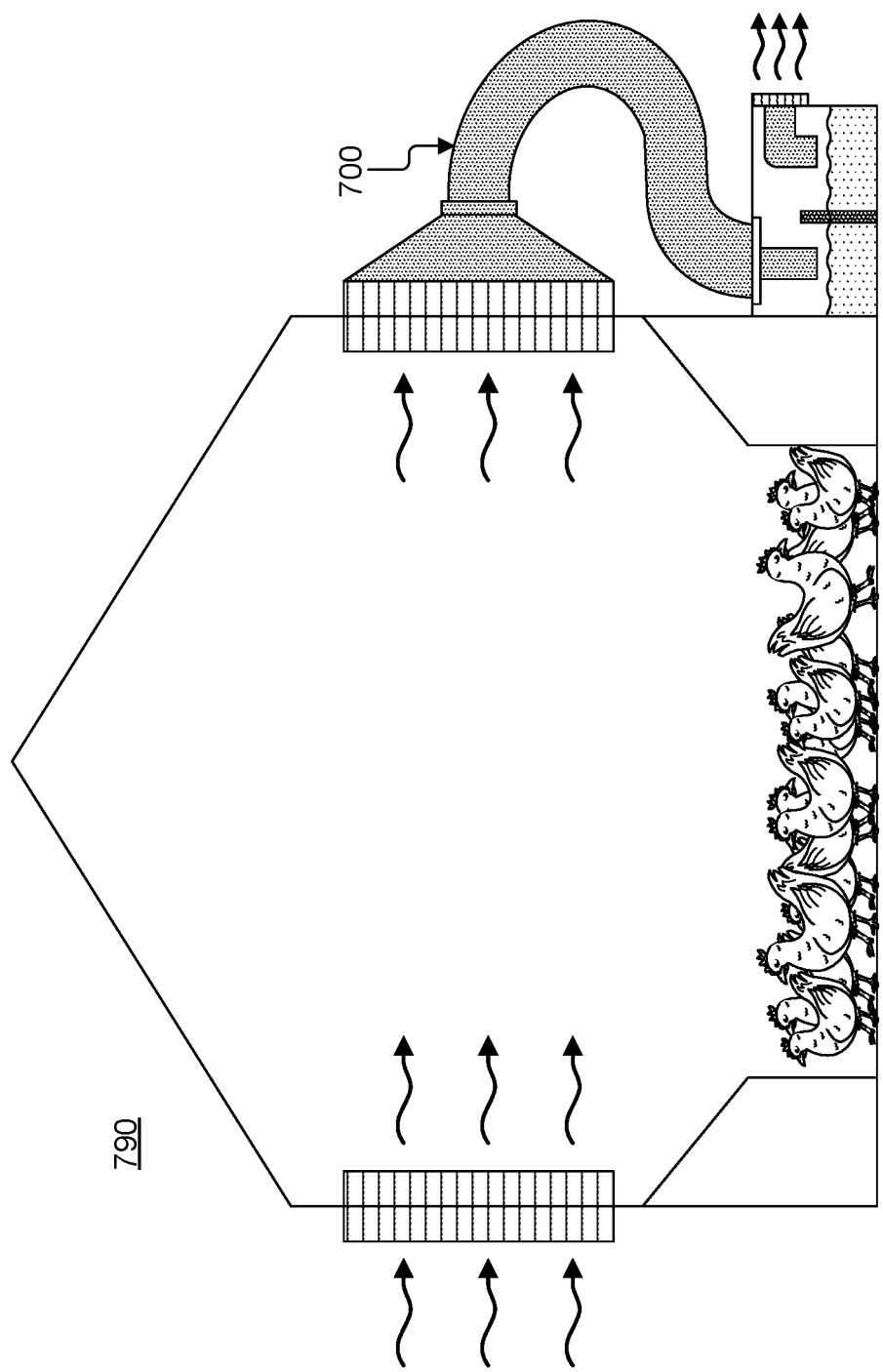
FIG. 7 illustrates an exemplary carbon capture adapter attached to a high air flow system, according to some embodiments of the present disclosure.

Referring now to FIG. 7, an exemplary carbon capture adapter 700 attached to a high airflow system 790 is illustrated. In some aspects, the high airflow system 790 may comprise airflow through a poultry or livestock farm to maintain fresh air and temperature of the farm. Large amounts of air are often flowed through a poultry or other livestock farm to maintain fresh air and a predefined temperature of the farm. The output of the airflow may be caught by the carbon capture adapter 700 and the air scrubbed of carbon. Poultry and other livestock being in a containment facility will produce larger amounts of carbon. The carbon capture apparatus may be attached to the output of these livestock farms, similar to the bitcoin farm or datacenter to then remove or scrub the carbon from the ambient air.

In some implementations, the carbon capture adapter 700 may be configured within a high airflow system that comprises at least a portion of a commercial or residential building, such as a house or apartment building, as non-limiting examples. By way of example and not limitation, the carbon capture adapter 700 may be configured to capture air flowing through an attic or similar upper portion of a commercial or residential building. In some embodiments, the carbon capture adapter 700 may be configured as a standalone appliance within a commercial or residential building, or the carbon capture adapter may be integrated with at least one of a variety of exiting appliances, such as, by way of example and not limitation, a pool filtration system, a water softener, a dehumidifier, or an air handler, as non-limiting examples.

Figure 8:
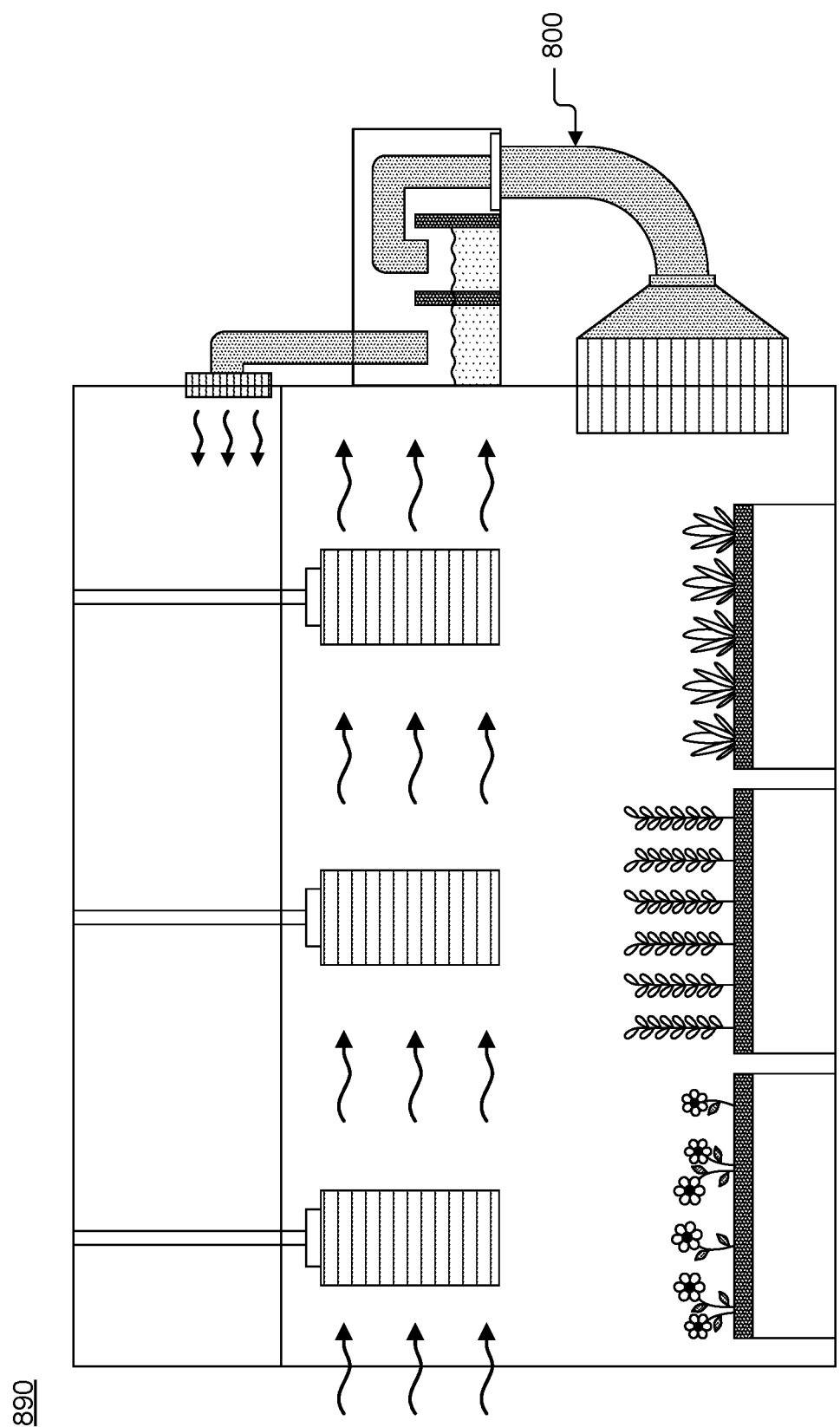
FIG. 8 illustrates an exemplary carbon capture adapter attached to a high air flow system, according to some embodiments of the present disclosure.

Referring now to FIG. 8, an exemplary carbon capture adapter 800 attached to a high airflow system 890 is illustrated. In some implementations, the high airflow system 890 may comprise the greenhouse itself without a direct attachment to an internal fan. In some aspects, a series of fans within a greenhouse may flow air throughout the enclosure causing passive waves of air that may be directed through a carbon capture adapter 800.

The carbon sink and may be sequestered to inject carbon directly back into the green house and cause a recirculating effect which is an organic symbiosis to recirculate the carbon captured back and this should be considered carbon recycling as the plants will absorb the carbon and the green has in effect becomes a recirculating carbon chamber. This will aid in vegetation growth so that there will be higher levels of carbon dioxide in the greenhouse recirculating as the carbon adapter is passing through the ambient air and recirculating it with higher levels of CO2.

Figure 9:
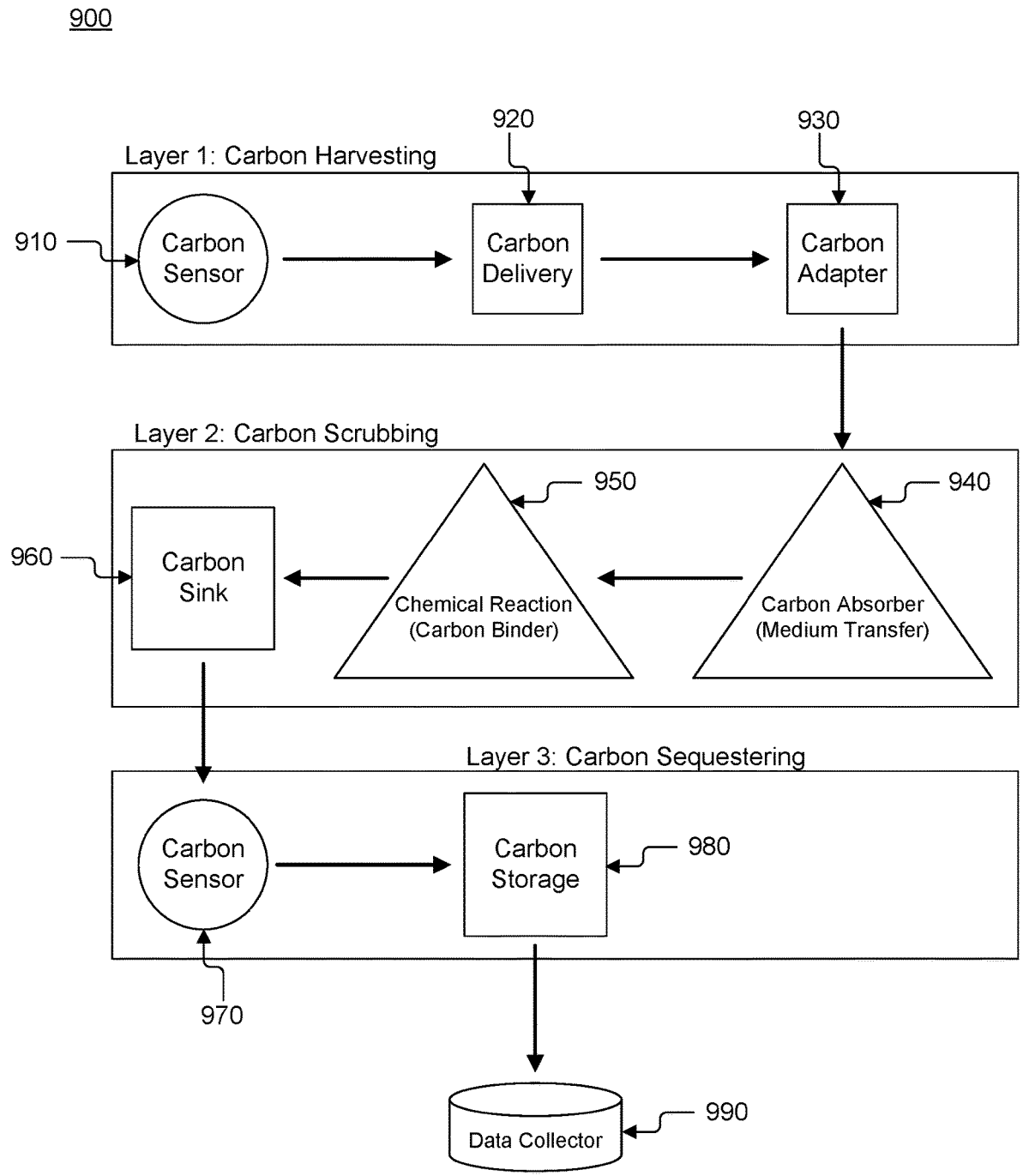
FIG. 9 illustrates an exemplary carbon capture process flow, according to some embodiments of the present disclosure.

Referring now to FIG. 9, an exemplary carbon capture process flow 900 is illustrated. As an illustrative example, a bitcoin miner, bitcoin farm, livestock farm, or other industrial applications, such as, for example and not limitation, paper plants, steel plants, or concrete manufacturing facilities may serve as an output of ambient air. At 910, the carbon sensor may be placed in front of the fan, turbine, or airflow of the bitcoin farm, livestock farm, or other industrial applications. This sensor may detect the amount of carbon entering the system and may be calculated in ppm. At 920, the bitcoin miner, bitcoin farm, livestock farm, or other industrial applications itself in this example may be the carbon delivery device, which also serves as the high air flow system. At 930, an adapter shroud may be placed on the output or the exhaust part of the bitcoin miner, bitcoin farm, livestock farm, or other industrial applications.

At 940, duct work may then create a chamber to capture the airflow to start the chemical reaction where the ambient air may be forced upon and react against the chemical filter of potassium hydroxide or other hydroxide agent in an aqueous solution thus creating the next step. At 950, the chemical reaction of an alkali salt such as, for example and not limitation, potassium hydroxide, sodium hydroxide, lithium hydroxide, or calcium hydroxide, or algae, microbes, or one or more other carbon absorbing agents in an aqueous solution may attract a bonding experience where the carbon dioxide may change mediums from air to liquid because of the chemical bond. The heat produced from the miner and the chemical reaction may aid in this process. Heat to cat integration may be used in the form of a bitcoin miner, industrial heat byproducts and other wasted heat from other products or processes in the system.

At 960, this reaction may take place in a holding tank, reservoir, chamber, enclosure, filtration system that creates a carbon sink. At 970, the exhaust where the ambient air from 920 may now be released into the atmosphere may leave the carbon sink causing the necessary bonding reaction to attract the carbon into the aqueous solution so that the output may have less carbon than first entering the system and the process flow. This is where a second sensor may take another reading and send the data to the controller board. In this example there may be a controller board from the 920 carbon delivery device that can be integrated with or a controller board that may be needed separate as shown in the previous FIG. 480.

At 980, the sequestering process can take place, and this may be the removal of the filter that now has stored carbon in it and replacement of the filter or more potassium hydroxide or other hydroxide. The reaction may form potassium bicarbonate or another bicarbonate in the filter and now is ready for the extraction of this material for real world applications and uses of the potassium bicarbonate or other bicarbonates or to convert it to pure carbon to be delivered to another system.

At 990, data may be sent to the controller board to allow feedback in a closed loop system to take place. This may allow for control of fan speed in the input or output to change. This may allow the CFM or the amount of carbon entering the closed loop system to be more or less per minute. The feedback also may control the concentration of the potassium hydroxide or other hydroxide to be more or less entering the absorber and filter process. The feedback may alert an error or may alert that the system has low potassium hydroxide or other hydroxide that an end user or integration may need to add more.

The controller board may also be able to detect that the filter and absorber may not be able to absorb any more carbon and the filter may need to be changed and replaced. The control board may be able to collect in real time and keep a history of how much carbon has been captured, scrubbed and removed from the air giving it integration capabilities through the methods of an API or equivalent data integration technology to be able to use and send the data and use this information in the future for carbon credits.

Figure 10:
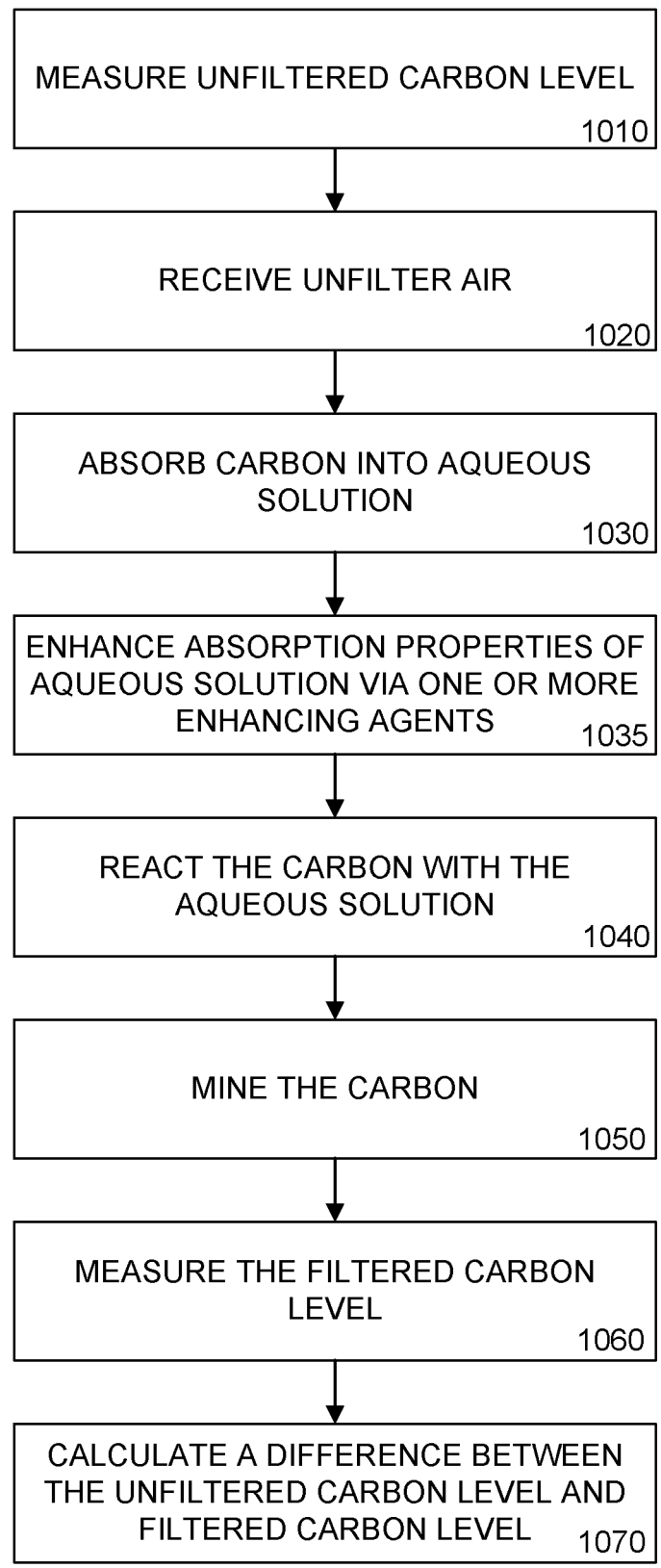
FIG. 10 illustrates an exemplary method for carbon capture utilizing a carbon capture adapter, according to some embodiments of the present disclosure.

Referring now to FIG. 10, exemplary method steps 1000 for capturing carbon from a high air flow system are illustrated. At 1010, the carbon level of unfiltered ambient air from a high air flow system may be measured, and at 1020, unfiltered air may be received. At 1030, carbon may be absorbed into an aqueous solution. In some non-limiting exemplary implementations, one or more supplemental devices or components may be used or integrated with a carbon capture adapter to facilitate or enhance carbon absorption. By way of example and not limitation, one or more of: an electrostatic precipitator, a wet scrubber, a cyclone separator, or a hydrocyclone separator may be used to facilitate or enhance carbon absorption.

In some non-limiting exemplary implementations, one or more salts, such as, for example and not limitation, potassium chloride or sodium chloride, may be retrieved from at least one storage receptacle and mixed with an incoming supply of water or similar solvent to form a continuous supply of the aqueous solution that may be used as an absorbent that may be directed from a first chamber, through at least one membrane, diaphragm, or similar medium of exchange and into a second chamber to facilitate a process that stimulates one or more electrolytes to lose an outer electron that may be facilitated by an electrolysis process to create an anode and a cathode or electrochemical process to generate at least one substance, such as, for example and not limitation, sodium, lithium, or potassium hydroxide, which may be used as a carbon absorption compound and vice versa, as the reaction may be reversed to release carbon dioxide. The absorption compound may be stored within at least one storage reservoir so that the compound may be used as needed by a carbon capture adapter. In some aspects, the electrochemical reaction of an anode and a cathode may be used to create an absorbent that captures carbon, and the reverse process may be used to release and capture carbon dioxide. In some implementations, the process or the cathode side (compartment) of the electrochemical process may be used as the filtration process and sequestering of carbon dioxide or the release thereof to sequester the carbon dioxide into another chamber or compartment.

In some non-limiting exemplary embodiments, at 1035, the absorption properties of the aqueous solution may be enhanced by one or more enhancing agents, such as, for example and not limitation, rubidium, cesium, francium, beryllium, magnesium, calcium, strontium, barium, or radium, as non-limiting examples. At 1040, the carbon may react with the aqueous solution to cause a medium transfer and chemical binding reaction. At 1050, the collected carbon may be mined or extracted. At 1060, the carbon level of the filtered ambient air may be measured. At 1070, the difference between the carbon levels may be calculated.

Figure 11:
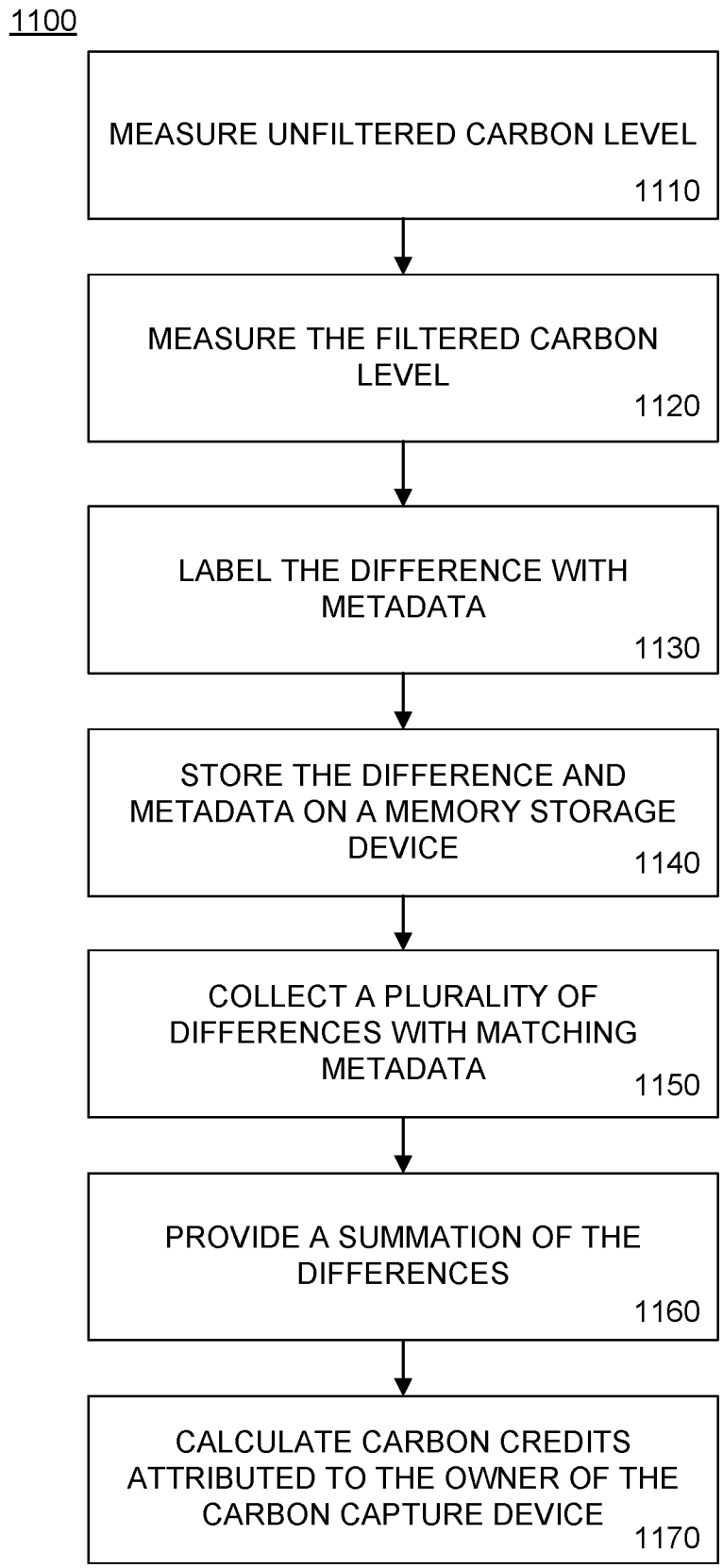
FIG. 11 illustrates an exemplary method of calculating carbon capture utilizing a carbon capture device, according to some embodiments of the present disclosure.
Figure 12A:
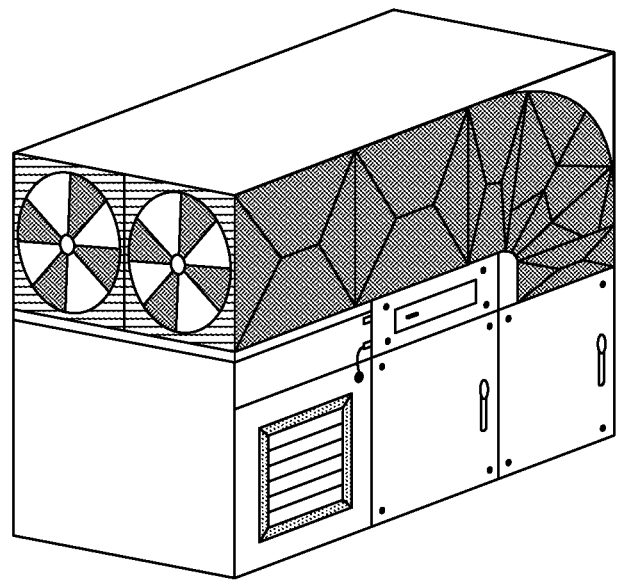
FIG. 12A illustrates an exemplary carbon capture adapter, according to some embodiments of the present disclosure.
Figure 12B:
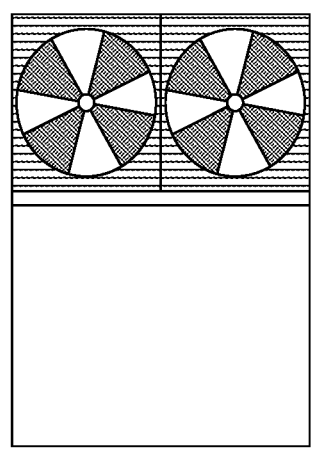
FIG. 12B illustrates an exemplary carbon capture adapter, according to some embodiments of the present disclosure.
Figure 12C:
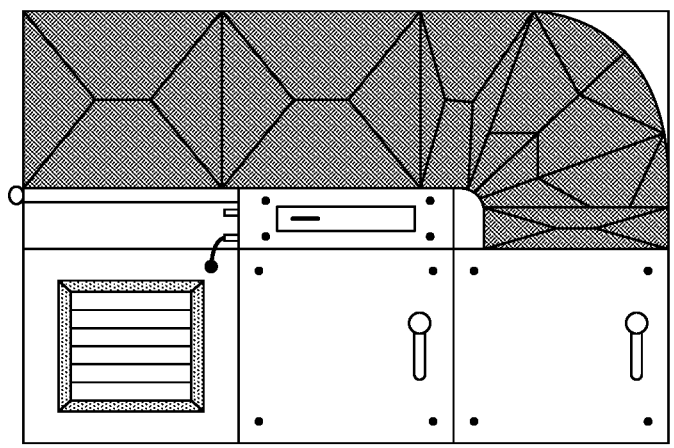
FIG. 12C illustrates an exemplary carbon capture adapter, according to some embodiments of the present disclosure.
Figure 12D:
FIG. 12D illustrates an exemplary carbon capture adapter, according to some embodiments of the present disclosure.
Figure 12E:
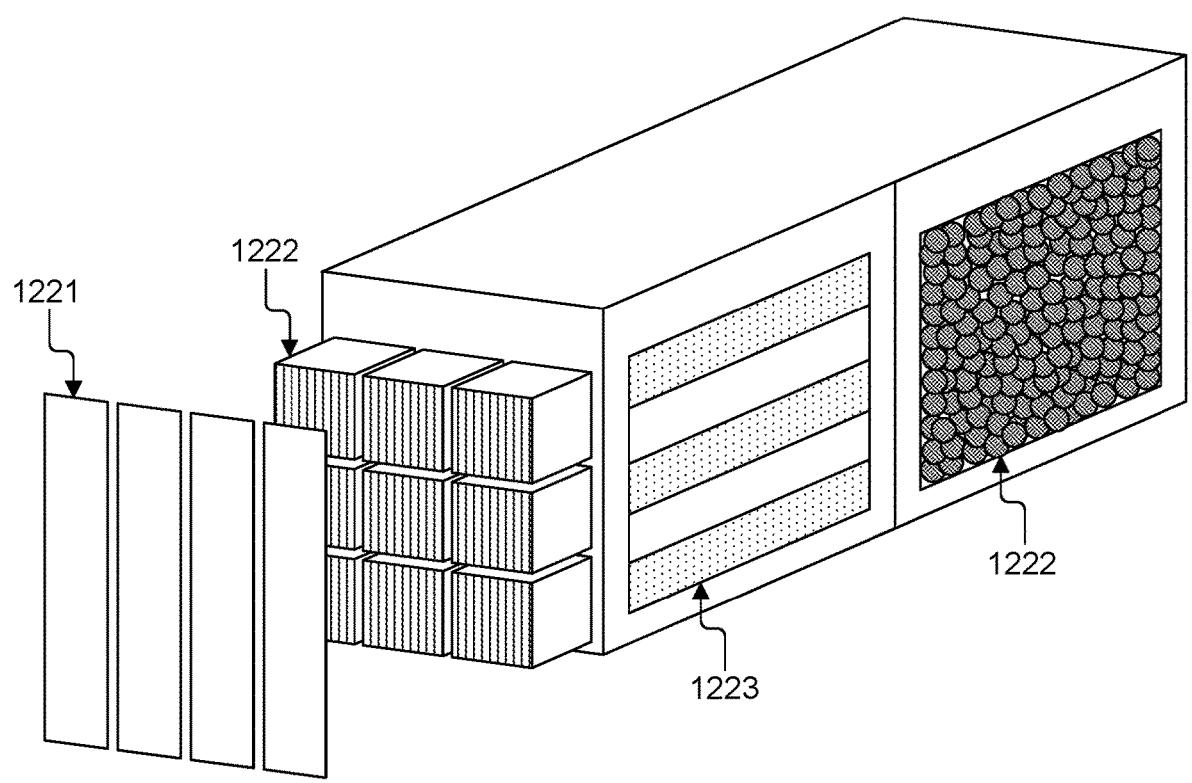
FIG. 12E illustrates an exemplary carbon filtering system for a carbon capture adapter, according to some embodiments of the present disclosure.

Referring now to FIG. 11, exemplary method steps 1100 for calculating carbon capture is illustrated. At 1110, the carbon level of unfiltered air from a high air flow system may be measured. The ambient air may pass through a carbon capture device, and at 1120, the carbon level of filtered air may be measured. At 1130, the calculated difference may be labeled with metadata. This metadata to be used is input carbon ppm, output carbon ppm, input air cfm. At 1140, the calculated difference and the metadata may be stored on a memory storage device, such as blockchain, database, ledger, flatfile, spooling on text file among other data collection, storage and archiving.

At 1150, a plurality of differences in carbon levels may be collected and stored. At 1160, the plurality of differences may be summed, and at 1170, the summation may be used to calculate carbon credits attributed to the owner of one or both the high air flow system and the carbon capture device. In some embodiments, the summation comprises data sufficient enough to create real time, almost real time, and historical carbon credits attributed to the meta data.

Referring now to FIGS. 12A-12E, an exemplary carbon filtering system 1220 for an exemplary carbon capture adapter 1200, according to some embodiments of the present disclosure, is Illustrated.

In some aspects, a carbon capture adapter 1200 may comprise one or more filtering mechanisms to remove one or more unwanted or undesired substances, compounds, elements or particles from air or fluid using the carbon capture adapter 1200. In some implementations, the carbon capture adapter 1200 may comprise a plurality of filtering mechanisms. In some embodiments, two or more filtering mechanisms may be configured in a stacked, layered, or similar sequential format or configuration to enhance the total filtering capabilities of the carbon capture adapter 1200. By way of example and not limitation, the carbon capture adapter 1200 may comprise one or more of: at least one mechanical filter 1221 and/or at least one adsorbent filter 1222 in addition to or instead of the previously described functionality of at least one absorbent filter 1223. In some non-limiting exemplary embodiments, one or more of the filters 1221, 1222, 1223 may be removed from the carbon capture adapter 1200 and replaced as needed to facilitate the longevity of the carbon capture adapter 1200. In some non-limiting exemplary embodiments, one or more adsorbent filters 1222 may remove one or more gases or trace amounts of carbon dioxide that may have escaped the absorbent filter(s) 1223.

In some implementations, the adsorbent filter 1222 may comprise an activated carbon filter. By way of example and not limitation, the absorbent filter 1222 may at least partially comprise one or more of: activated charcoal or activated carbon from bamboo, sugarcane, or coconut shells or stalks. In some non-limiting exemplary embodiments, the adsorbent filter 1222 may comprise a structure that comprises a square, honeycomb configuration, or a plurality of pellets or similarly small objects, as non-limiting examples.

In some aspects, the adsorbent filter 1222 may be configured to remove one or more gases, substances, or particles from air or fluid passing through at least one portion of the carbon capture adapter 1200, including, for example and not limitation, one or more volatile organic compounds ("VOCs"), such as benzene, toluene, xylene, formaldehyde, ethanol, trichloroethylene ("TCE"), perchloroethylene ("PERC"), acetone, ethylbenzene, methylene chloride ("dichloromethane"), styrene, 1,2-dichloroethane, vinyl chloride, isopropyl alcohol, methanol, butane, pentane, hexane, heptane, octane, limonene, terpenes, ethylene glycol, propylene glycol, chloroform, carbon tetrachloride, dichlorobenzene, or chlorobenzene, as non-limiting examples.

In some non-limiting exemplary embodiments, the adsorbent filter 1222 may at least partially comprise at least one impregnation method such as, for example and not limitation, the impregnation of the activated carbon as an example of an absorbent. In some aspects, impregnating the porous structure of an absorbent such as, for example and not limitation, activated carbon with one or more compounds such as, for example and not limitation, potassium hydroxide and/or sodium hydroxide may enable the adsorbent filtration process to capture both VOCs as well as carbon from air or fluid moving through at least one portion of the carbon capture adapter 1200.

In some implementations, the carbon capture adapter 1200 may comprise at least one mechanical filter 1221. In some aspects, the mechanical filter 1221 may be configured to capture and remove one or more small particles or objects from air or fluid passing through at least one portion of the carbon capture adapter 1200. In some non-limiting exemplary embodiments, the mechanical filter 1221 may at least partially comprise a high efficiency particulate air ("HEPA") filter. By way of example and not limitation, the mechanical filter 1221 may comprise one or more fibers configured to capture and remove one or more particulates or impurities from air or fluid passing through the carbon capture adapter 1200, such as dust, pollen, pet dander, mold spores, smoke particles, bacteria, viruses, dust mites, fine particulate matter (PM2.5), allergens, pet allergens, ragweed pollen, grass pollen, tree pollen, insect debris, lint, smoke, odors, or VOCs, as non-limiting examples.

Figure 13:
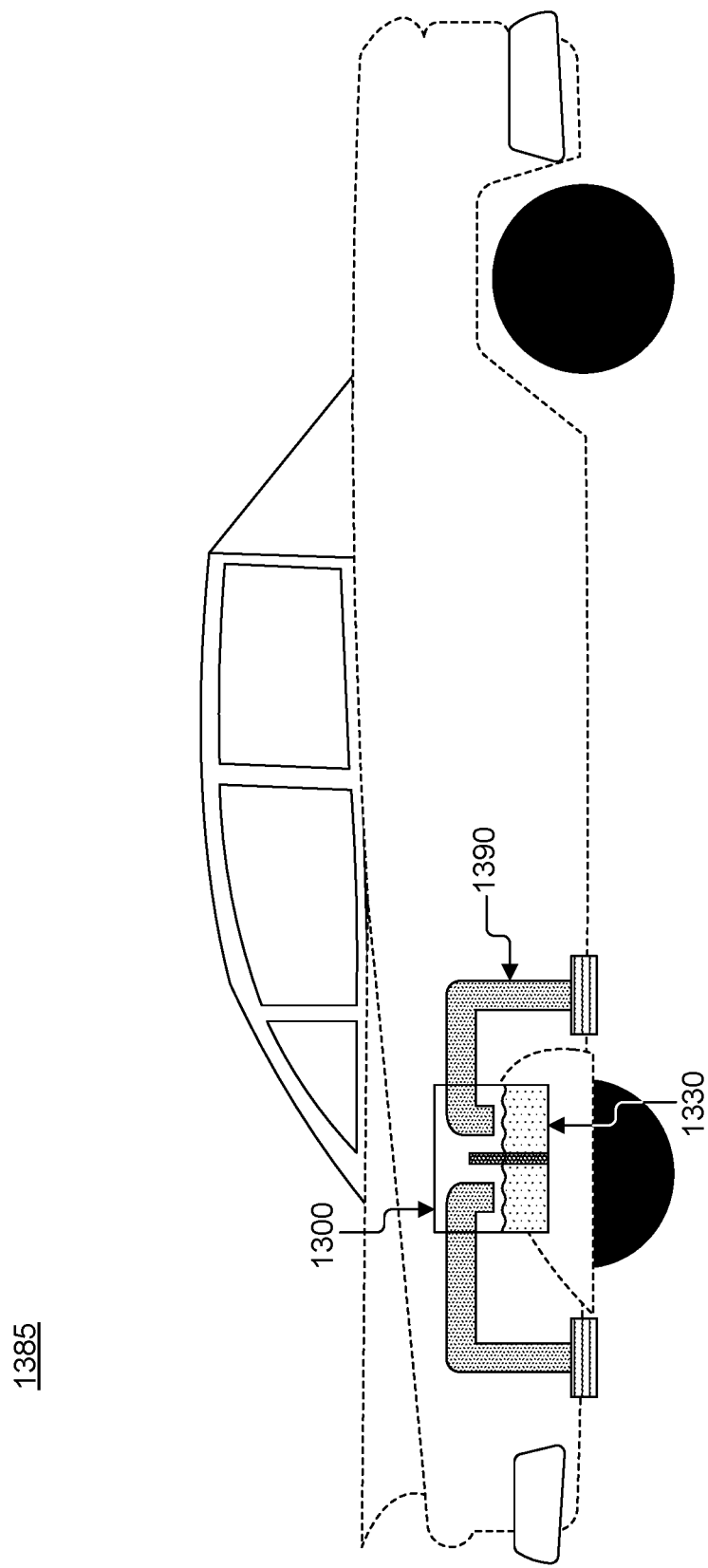
FIG. 13 illustrates an exemplary carbon capture adapter attached to an automobile, according to some embodiments of the present disclosure.

Referring now to FIG. 13, an exemplary carbon capture adapter 1300 attached to an automobile 1385, according to some embodiments of the present disclosure, is illustrated. In some aspects, the carbon capture adapter 1300 may be configured to be removably or permanently secured to at least one internal or external portion of at least one vehicle. By way of example and not limitation, the carbon capture adapter 1300 may be configured to be at least temporarily or permanently secured to at least one portion of a vehicle comprising one or more of: an automobile 1385, such as, for example and not limitation, a car, truck, or van; a motorcycle; a locomotive; an aircraft (such as, for example and not limitation, one or more wings of the aircraft); or a watercraft, as non-limiting examples.

In some non-limiting exemplary embodiments, the carbon capture adapter 1300 may be configured to be at least temporarily secured to at least one portion of an automobile 1385. In some aspects, the carbon capture adapter 1300 may be configured to be secured to a portion of a gasoline-powered, diesel-powered, or electrically-powered automobile 1385 at a location comprising high air flow. In some implementations, the carbon capture adapter 1300 may comprise at least one air intake opening 1390 configured to receive high velocity air flow passing around an outer surface of the automobile 1385 as the automobile 1385 moves. In some embodiments, the air intake opening 1390 may comprise a plurality of openings 1390 in the form of, for example and not limitation, an intake manifold. In some non-limiting exemplary implementations, the air intake opening 1390 may be integrated with at least one portion of the exhaust system of a gasoline-powered or diesel-powered automobile 1385, such as, for example and not limitation, after the catalytic converter, so as to capture and remove at least a portion of the carbon emitted directly from the exhaust generated by the automobile 1385.

In some aspects, the carbon capture adapter may comprise at least one carbon sensor configured to detect an amount of carbon dioxide and/or carbon monoxide within the air entering the carbon capture adapter 1300. In some implementations, air entering via the air intake opening 1390 may be directed to at least one container portion 1330 of the carbon capture adapter 1300 via one or more pipes, tubes, or similar structures. In some non-limiting exemplary embodiments, one or more in-line fans or similar devices may be configured to increase the velocity of air entering the container portion 1330 even further.

In some implementations, air flowing through the container portion 1330 may experience one or more of: a chemical reaction, bonding/binding, electrolysis, heating, absorption, or adsorption to attract and remove at least a portion of the carbon from the air flowing through the container portion 1330, wherein the captured carbon may be directed to at least one carbon sink. In some non-limiting exemplary embodiments, at least one carbon sensor may be configured to measure the amount of carbon within air flowing out of the container portion 1330 in substantially real time to determine how much carbon was captured by the carbon capture adapter 1300. In some implementations, this data may be transmitted to at least one on-board computing system of the automobile 1385 for storage or subsequent analysis, as non-limiting examples. In some embodiments, the data may be transmitted to one or more servers in a cloud computing environment for storage or analysis. In some implementations, the computing system of the automobile 1385 may be configured to adjust one or more aspects of the functionality of the carbon capture adapter 1300 in substantially real time, such as the fan speed or size of the air intake opening 1390, as non-limiting examples. In some aspects, carbon captured within the carbon sink may be stored in a substantially solid form for use in one or more relevant applications.

In some embodiments, the carbon capture adapter 1300 may be configured proximate to a battery of an electrically-powered automobile 1385. In some implementations, the battery of an electrically-powered vehicle 1385 may comprise one or more structures, such as a manifold, configured to direct air flow around the battery to provide a cooling effect. In some aspects, the carbon capture adapter 1300 may be configured to receive this air flow via the air intake opening 1390, wherein the air flow may facilitate the functionality of the carbon capture adapter 1300. In some non-limiting exemplary embodiments, heat drawn from the battery of the electrically-powered vehicle 1385 may enhance the functionality of the carbon capture adapter 1300, such as, for example and not limitation, be serving as a catalyst for one or more chemical reactions that may facilitate a carbon binding process, as a non-limiting example. In some implementations, one or more electrolysis or ionization processes may also be configured to occur within the container portion 1330 to enhance or accelerate the ability of the carbon capture adapter 1300 to remove carbon from air flowing therethrough.

In some aspects, the carbon sensors of the carbon capture adapter may be used to facilitate a measurement of the amount of unfiltered carbon that traveled through the carbon capture adapter 1300 as well as an amount of filtered carbon that was removed by the carbon capture adapter 1300. In some implementations, these measurements may facilitate a real-time determination of the amount of carbon removed by the carbon capture adapter 1300 during use of automobile 1385, thereby enabling the owner of the automobile 1385 to potentially receive a quantity of carbon credits or similar quantified metrics associated with usage of the automobile 1385. In some aspects, the attachable nature of the carbon capture adapter 1300 may enable the carbon capture adapter 1300 to be retrofitted to existing automobiles 1385 or other existing vehicles.

Figure 14:
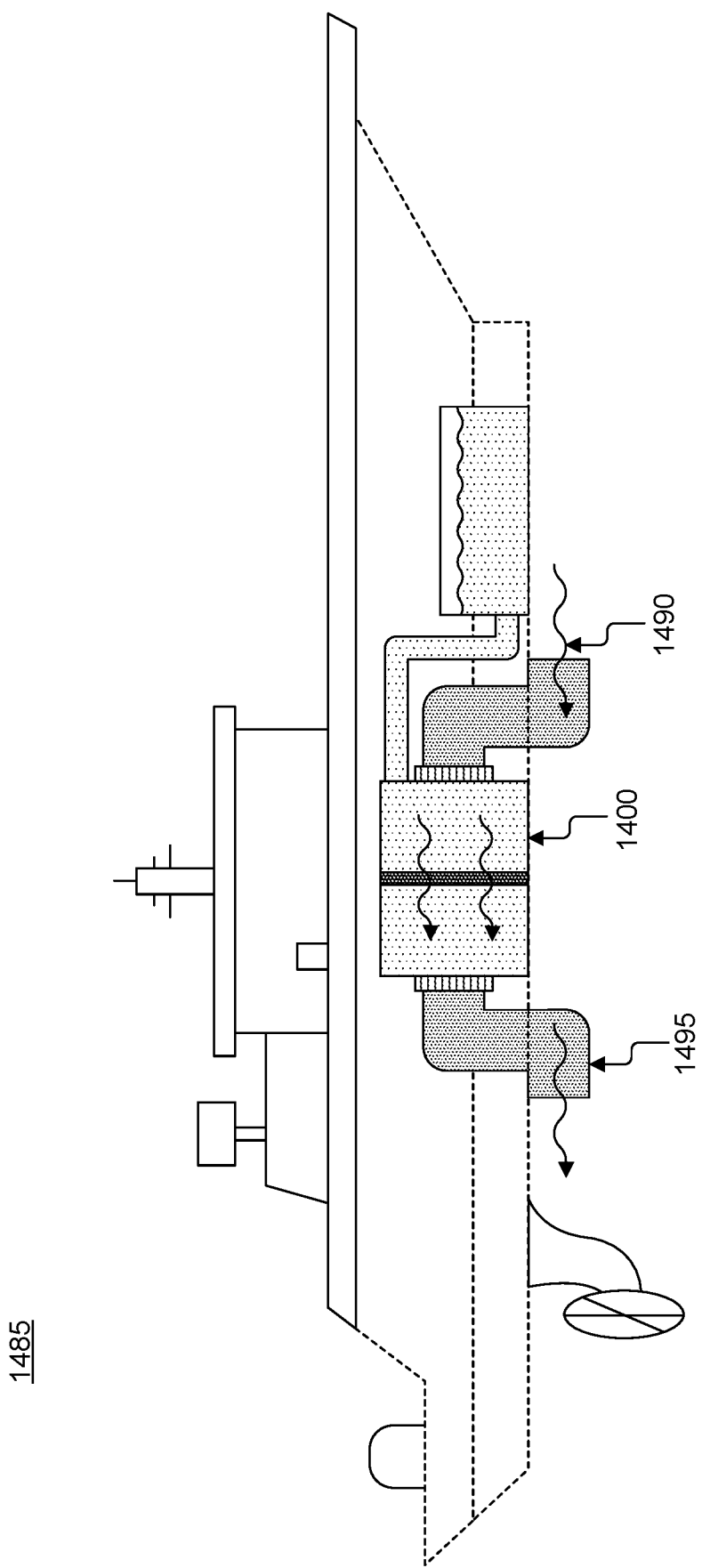
FIG. 14 illustrates an exemplary carbon capture adapter attached to a watercraft, according to some embodiments of the present disclosure.

Referring now to FIG. 14, an exemplary carbon capture adapter 1400 attached to a watercraft 1485, according to some embodiments of the present disclosure, is illustrated. In some aspects, the carbon capture adapter 1400 may be at least temporarily secured within at least one portion of a watercraft 1485. In some implementations, the carbon capture adapter 1400 may be configured within an internal portion of the hull of the watercraft 1485 such that one or more intake openings 1490 may receive fluid in the form of water through which the watercraft 1485 travels, wherein the water may be directed by one or more pipes, tubes, or similar structures through the carbon capture adapter 1400 such that at least a portion of the carbon within the water may be removed therefrom.

In some non-limiting exemplary embodiments, the intake opening 1490 of the carbon capture adapter 1400 may be configured to receive water used to cool one or more engines used to power the watercraft 1485. In some aspects, such water may draw heat away from the engine(s) as the water flows near or through the engines, and the captured heat may facilitate, enhance, or accelerate the functionality of the carbon capture adapter 1400. By way of example and not limitation, the heat may serve as a catalyst for one or more chemical reactions that may facilitate carbon binding within the carbon capture adapter 1400, as a non-limiting example. In some aspects, the carbon capture adapter 1400 may comprise at least one outlet 1495, such as, for example and not limitation, a pipe or tubing, configured to release water back to the source, wherein the released water comprises a reduced carbon content.

Figure 15:
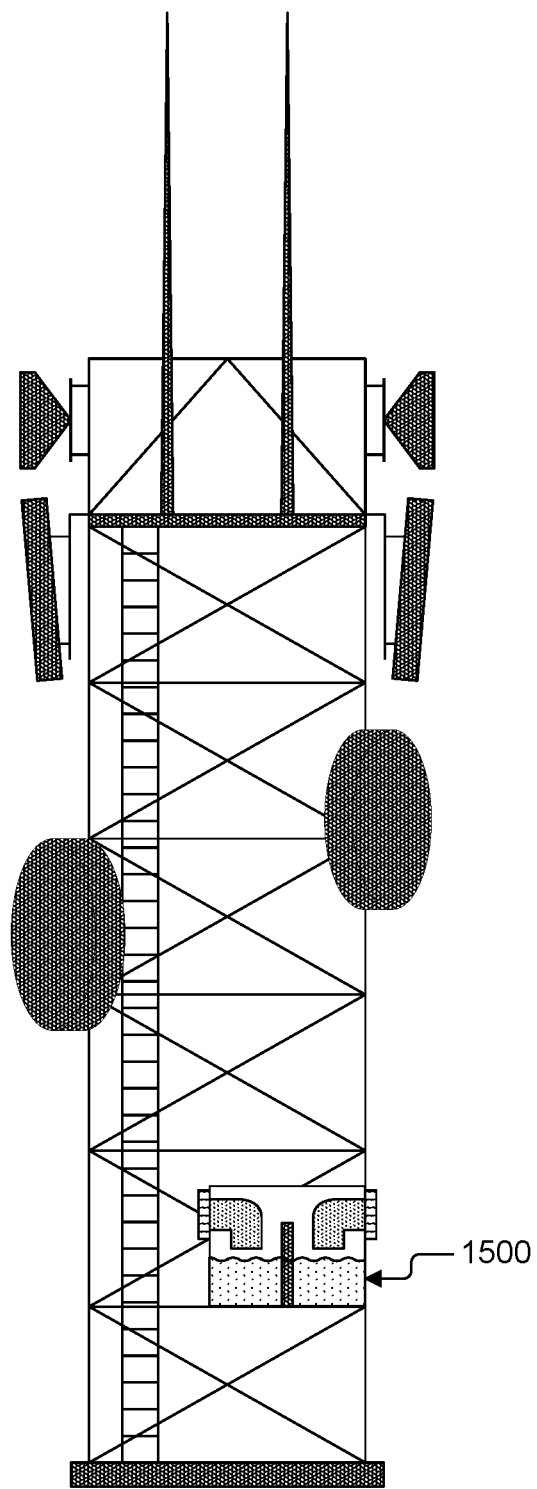
FIG. 15 illustrates an exemplary carbon capture adapter configured at a high air flow location, according to some embodiments of the present disclosure.

Referring now to FIG. 15, an exemplary carbon capture adapter 1500 configured at a high air flow location, according to some embodiments of the present disclosure, is illustrated. In some aspects, the carbon adapter 1500 may be configured to be at least temporarily secured to one or more various locations that may be prone to experiencing high velocity air flow and/or that may be proximate to air flow sources comprising high amounts of carbon, as non-limiting examples. By way of example and not limitation, the carbon capture adapter 1500 may be configured to be at least temporarily secured to an existing structure that comprises a wind turbine or cellular service tower 1585, as non-limiting examples.

In some aspects, a cellular service tower 1585 may comprise a desirable location for one or more carbon capture adapters 1500 in that the cellular service tower 1585 may be prone to at least occasionally experiencing high velocity air flow from wind. In some implementations, lower portions of a cellular service tower 1585 may be generally unused, as upper portions may be more desirable for cellular service devices and components. In some embodiments, such unused lower portions of the cellular service tower 1585 may be adapted to be integrated with one or more carbon capture devices 1500.

Figure 16:
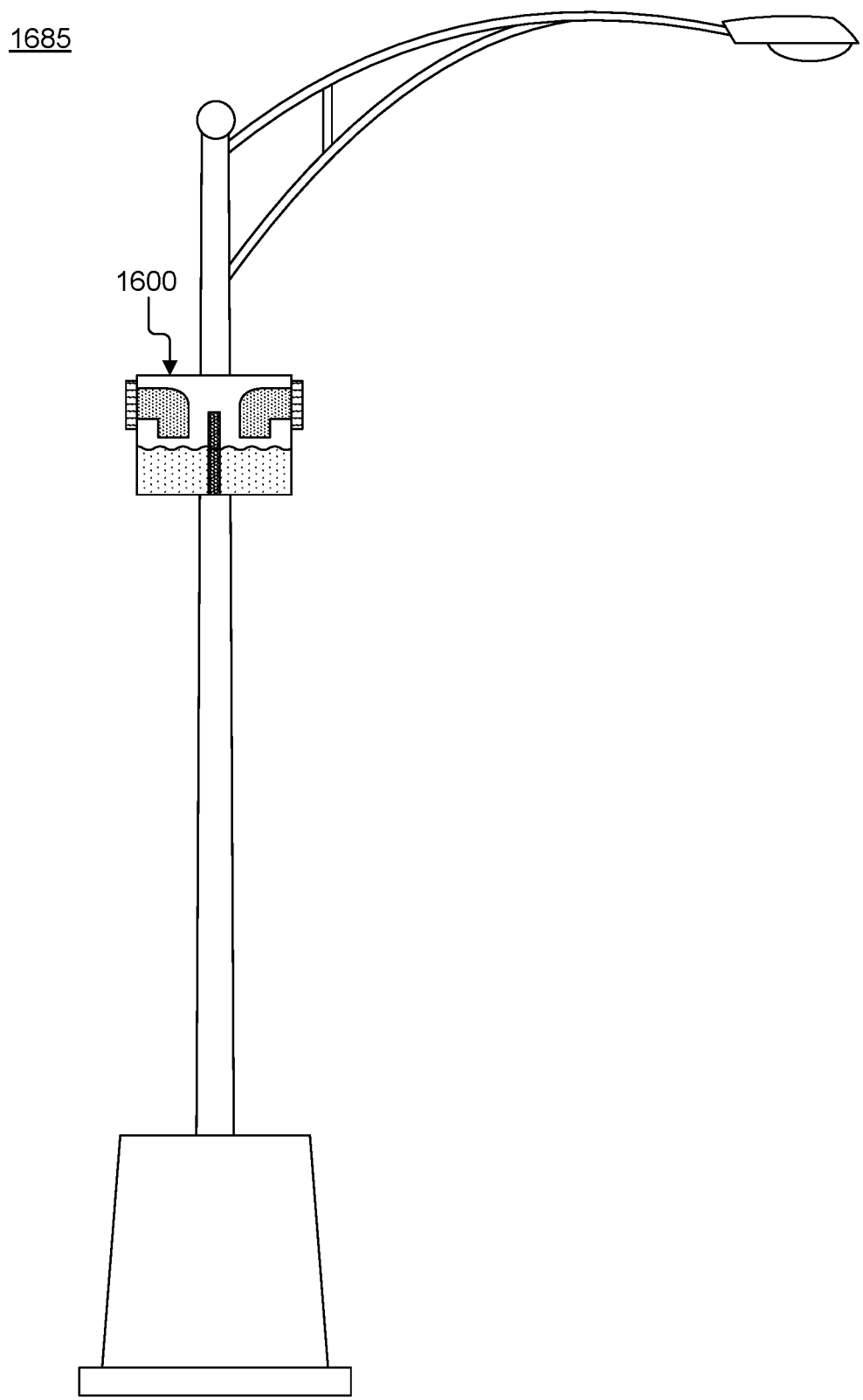
FIG. 16 illustrates an exemplary carbon capture adapter configured at a high air flow location, according to some embodiments of the present disclosure.

Referring now to FIG. 16, an exemplary carbon capture adapter 1600 configured at a high air flow location, according to some embodiments of the present disclosure, is illustrated. In some aspects, the carbon capture adapter 1600 may be configured to be at least temporarily secured to at least one portion of an existing structure prone to experiencing high velocity air flow and/or proximate to one or more sources of air flow comprising a high carbon content, as non-limiting examples. In some implementations, the carbon capture adapter 1600 may be configured to be secured to a portion of an existing structure proximate to a roadway traversed by automobiles, such as a street sign or a street light 1685, as non-limiting examples, such that the carbon capture adapter 1600 may be configured to capture carbon emitted by one or more of the automobiles.

Referring now to FIG. 17, an exemplary method 1700 for carbon capture using a carbon capture adapter, according to some embodiments of the present disclosure, is illustrated. In some implementations, process 1700 may be at least partially facilitated by a carbon capture adapter.

In some aspects, at 1705, an amount of airflow may be received via at least one air movement device, such as, for example and not limitation, a blower, fan, or turbine. In some implementations, at 1710, the received air may be pulled through at least one cyclone separator or similar mechanism. In some embodiments, the cyclone separator may facilitate the removal of one or more dust particles, pollen, or similarly-sized particles from the received air. In some aspects, at 1715, the air may be directed through at least one mechanical filtering mechanism, such as, for example and not limitation, a HEPA filter, to capture and remove one or more smaller or finer particles from the air that may have escaped the cyclone separator.

In some implementations, at 1720, the air may be directed to a first container portion of a carbon capture adapter wherein the air may be compressed and directed through at least one Venturi tube or similar structural component to introduce the air in a pressurized form to at least one aqueous solution comprising one or more compounds that may have an absorbent result such that the pressurized air may provide an aeration effect to the aqueous solution. In some aspects, at 1725, the aqueous solution may be circulated via an applied amount of centrifugal force to generate an angular velocity and abrasion within the aqueous solution to produce a turbulent flow that may increase or enhance the ability of the aqueous solution to absorb carbon from the received air. In some embodiments, at 1730, the outer portions of the aqueous solution produced by the centrifugal spinning, which may comprise denser particles within the aqueous solution, such as, for example and not limitation, potassium bicarbonate, may be introduced to one or more hydrocyclone separators. In some aspects, at 1735, one or more internal portions of the aqueous solution comprising, for example and not limitation, an amount of potassium hydroxide, may be directed by one or more sprayers or similar devices to at least one wet scrubber within a second container portion of the carbon capture adapter to prepare the aqueous solution for further use. In some implementations, at 1740, the aqueous solution extracted and processed by the hydrocyclone separator may be directed to at least one carbon sink, wherein the hydrocyclone separator may sequester carbon from the aqueous solution so the carbon may be stored in solid, sludge, or liquid form. In some non-limiting exemplary embodiments, at 1742, at least a portion of the aqueous solution extracted by the hydrocyclone separator may be exposed to one or more high-pressure homogenizers and/or one or more microfluidizers to enhance or optimize the interaction between carbon dioxide from the received air and the aqueous solution. In some aspects, by way of example and not limitation, one or more high-shear rotor-stator mixers may be used to break down the size of the carbon dioxide globules within the aqueous solution such that the contact surface area between the carbon dioxide globules and the aqueous solution may be increased, thereby enhancing the absorption kinetics of the carbon dioxide within the aqueous solution. As a non-limiting illustrative example, a high-shear fluidizer may be configured to operate at approximately 40,000 psi to generate shear, impact, and energy dissipation forces to break down the carbon dioxide gas into smaller globules within the carbon sink. In some aspects, at 1745, air may be directed from the carbon sink through one or more of: at least one mist eliminator and/or at least one adsorption filtering mechanism to remove one or more VOCs therefrom.

In some non-limiting exemplary embodiments, at 1750, electricity from one or more electrochemical cells, such as, for example and not limitation, a chloralkali cell, may be applied to the aqueous solution to facilitate an electrochemical reaction to enhance carbon binding facilitated by the aqueous solution.

Figure 18:
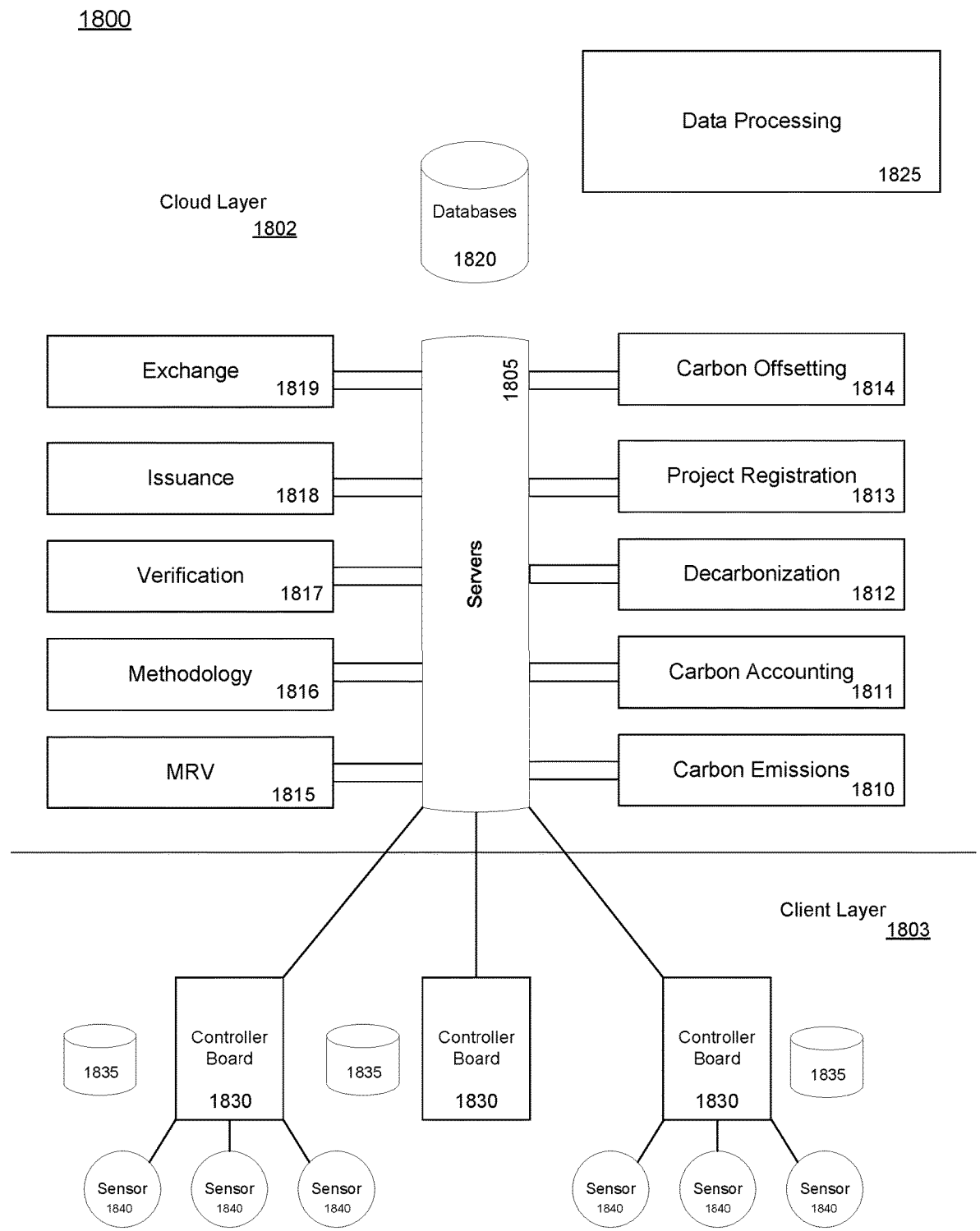
FIG. 18 illustrates a block diagram of an exemplary system architecture for a carbon capture system, according to some embodiments of the present disclosure.

Referring now to FIG. 18, a block diagram of an exemplary system architecture for a carbon capture system 1800, according to some embodiments of the present disclosure, is illustrated. In some aspects, the carbon capture system 1800 may comprise a cloud layer 1802 and a client layer 1803. In some embodiments, the cloud layer 1802 may comprise one or more servers 1805 comprising one or more coded instructions or algorithms, such as, for example and not limitation, at least one software application, configured, for example and not limitation, to facilitate a cloud computing environment or platform using data received from at least one controller board 1830 the client layer 1803, wherein the controller board(s) 1830 may be communicatively coupled to the servers 1805. In some implementations, the servers 1805 may be communicatively coupled to one or more system modules 1810, 1811, 1812, 1813, 1814. 1815, 1816, 1817, 1818, 1819, such as, for example and not limitation, a carbon emissions module 1810, a carbon accounting module 1811, a decarbonization module 1812, a project registration module 1813, a carbon offsetting module 1814, an MRV (measure, report, verify) module 1815, a methodology module 1816, a verification module 1817, an issuance module 1818, and an exchange module 1819, such that the servers 1805 may be configured to receive data from or transmit data to each of the modules 1810, 1811, 1812, 1813, 1814, 1815, 1816, 1817, 1818, 1819. In some non-limiting exemplary embodiments, the carbon capture system 1800 may comprise a canonical architecture. In some aspects, the servers 1805 may be communicatively coupled to one or more of the modules 1810, 1811, 1812, 1813, 1814, 1815, 1816, 1817, 1818, 1819 via one or more direct wired connections or one or more wireless network connections, such as, for example and not limitation, a connection to the global, public Internet, a local area network ("LAN"), or a cellular data network.

In some implementations, one or more types of data may be received from the carbon emissions module 1810 pertaining to an amount of carbon emitted or released during performance or execution of one or more user processes, activities, or operations. In some embodiments, one or more types of data received from the carbon accounting module 1811 may pertain to an assessment or measurement of the quantity of carbon emissions generated by the user. In some aspects, one or more types of data received from the decarbonization module 1812 may pertain to a quantified carbon emissions reduction achieved via one or more carbon reduction methodologies, such as, for example and not limitation, by using one or more carbon capture adapters. In some implementations, the project registration module 1813 may comprise one or more types of data pertaining to the formal registration of one or more carbon reduction endeavors incorporated by the user into the user's carbon-emitting processes or activities. In some embodiments, the carbon offsetting module 1814 may comprise one or more types of data pertaining to one or more processes, systems, or devices implemented by the user to offset or decrease the user's carbon emissions, such as, for example and not limitation, by using one or more carbon capture adapters. In some aspects, the MRV module 1815 may comprise data pertaining to measuring, reporting, and verifying the carbon emission reduction techniques implemented by the user. In some implementations, the methodology module 1816 may comprise one or more types of data pertaining to one or more carbon emission reduction methodologies implemented by the user, such as, for example and not limitation, the implementation of one or more carbon capture adapters. In some embodiments, the verification module 1817 may comprise one or more types of data pertaining to the official verification of the user's carbon emissions, such as may be facilitated by one or more government officials or agencies, as non-limiting examples. In some aspects, the issuance module 1818 may comprise one or more types of data pertaining to the issuance of one or more carbon credits to the user. In some implementations, the exchange module 1819 may comprise one or more types of data pertaining to the sale or transfer of one or more carbon credits.

In some aspects, the carbon capture system 1800 may be configured to receive and analyze data from the modules 1810, 1811, 1812, 1813, 1814, 1815, 1816, 1817, 1818, 1819 to facilitate measurement, reporting, and verification of one or more carbon emission reduction techniques or methodologies implemented by a user. In some implementations, the carbon capture system 1800 may be configured to efficiently receive, aggregate, and analyze data from a plurality of sources such that a user's carbon emission reduction endeavors may be accurately and timely assessed. In some embodiments, the carbon capture system 1800 may comprise one or more hardware and software components, including, in some implementations, one or more machine learning algorithms and/or artificial intelligence infrastructures, configured to recognize one or more trends or patterns in received data, determine and output one or more recommended solutions, or autonomously implement one or more adjustments to enhance a user's carbon emission reduction efforts.

In some aspects, the controller board may be configured to facilitate a closed-loop configuration for at least a portion of the carbon capture system 1800, wherein the controller board may be configured to receive one or more inputs indicative of one or more desired outcomes or set points, calculate or otherwise determine the difference between a desired input or set point and one or more actual outputs to generate one or more error signals, process the error signal by adjusting its size or strength, implement one or more control actions, such as, for example and not limitation, by adjusting or activating one or more motors, valves, or temperature controllers, and continuously monitor one or more outputs of the system 1800 and transmitting feedback back into the system 1800 to facilitate continuous improvement thereof.

In some embodiments, the controller board may be integrated with or communicatively coupled to one or more sensors or Internet of Things ("IoT") devices, such as, for example and not limitation, a non-dispersive infrared ("NDIR") sensor for carbon dioxide equivalent measurement, a digital or analog humidity sensor, a digital or analog temperature sensor, a digital or analog air velocity sensor, a digital or analog flow rate sensor, a pH sensor, a dissolved inorganic carbon sensor, a total dissolved inorganic carbon sensor, a carbon dioxide equivalent micro sensor, an ion chromatography sensor, an infrared spectroscopy sensor, or a conductivity sensor, as non-limiting examples.

In some implementations, the sensing devices 1840 communicatively coupled to each controller board 1830 in a closed-loop configuration of system 1800 may enable the controller board 1830 to control and direct one or more processes or operations of one or more carbon removal methodologies, such as, for example and not limitation, via at least one carbon capture adapter. By way of example and not limitation, the controller board(s) 1830 may be configured to adjust one or more pumps to alter a Venturi flow within a carbon capture adapter, adjust the angular momentum of one or more hydrocyclone or cyclone separators, or otherwise adjust or alter one or more functional aspects or parameters of a carbon capture adapter, including but not limited to air flow, pressure, chemical concentration(s), and/or particulate levels.

In some embodiments, the controller board(s) 1830 may be configured to exchange data with the sensing device(s) 1840 communicatively coupled thereto as well as one or more databases 1820 via the servers 1805, wherein the databases(s) 1820 may, in some aspects, comprise one or more portions of the carbon capture system 1800, such as, for example and not limitation, one or more of the modules 1810, 1811, 1812, 1813, 1814, 1815, 1816, 1817, 1818, 1819. In some implementations, the sensing device 1840 may be configured to communicate with the controller board(s) 1830 via one or more of a variety of protocols to facilitate integration of the carbon capture system 1800 with a diverse array of sensing device 1840 technologies. In some aspects, protocols facilitating data exchange between the controller board(s) 1830 and one or more sensing device(s) 1940 may comprise one or more of: analog, digital, I2C, Modbus RTU, SPI, RTD, UART, USB, Wi-Fi, Bluetooth, Zigbee, Z-Wave, LoRa, NB-IoT, CoAP, CAN, 1-Wire, RFID, NFC, or Ethernet, as non-limiting examples. In some implementations, the controller board(s) 1830 may be configured to implement one or more data handling or processing techniques to process one or more of a variety of data formats, transmission speeds, and/or error correction requirements associated with different protocols, thereby facilitating accurate and reliable data acquisition.

In some aspects, the servers 1805 may be configured to communicate with one or more databases 1820 (such as, for example and not limitation, RDBMS, time series databases, graph databases, NoSQL databases, or physical storage devices such as SSDs or HDDs) using one or more of a variety of database connectors and protocols to establish secure and efficient data exchange and thereby enable effective and efficient data storage and analysis. By way of example and not limitation, the protocols by which the servers 1805 may communicate with one or more databases 1820 may comprise one or more of: open database connectivity, Java database connectivity, RESTful APIs, message queuing telemetry transport, http/https, programming hooks, or one or more custom protocols. In some implementations, by supporting multiple database communication protocols, the servers 1805 may be adaptable to various database systems and architectures. In some embodiments, the servers 1805 may be configured to support network connectivity for remote monitoring and data access. In some implementations, the controller board(s) 1830 may be configured to be compatible with one or more cloud-based databases 1820, servers 1805, or APIs to enable advanced data analytics and remote management of the carbon capture system 1800.

In some aspects, the carbon capture system 1800 may comprise one or more relational database management systems used to store structured data that requires complex queries and transactional integrity. In some implementations, the carbon capture system 1800 may comprise one or more time series databases 1820 configured to store time-stamped data, such as when storing sequential sensing device 1840 readings, as a non-limiting example. In some embodiments, the carbon capture system 1800 may comprise one or more graph databases 1820 configured to store data that may comprise complex relationships and enable efficient mapping of sensor networks and dependencies. In some aspects, the carbon capture system 1800 may comprise one or more NoSQL or similar databases 1820 configured to store unstructured or semi-structured data.

In some implementations, the controller board(s) 1830 may be configured to allow for one or more customizable settings to define the granularity and frequency of data recorded from each sensing device 1840 communicatively coupled thereto, such as, for example and not limitation, by adjusting or more parameters like sampling rate, data aggregation level, and thresholds for data capture. In some embodiments, data from the sensing device 1840 may be configured to be routed to one or more predetermined databases 1820, 1830, data stores, or tables based at least partially on one or more of: sensing device 1840 type, data format, or other predetermined criteria. In some embodiments, each sensing device 1840 may be configured to generate one or more transactional records to ensure capture and logging of significant events or measurements, which may facilitate accurate tracking and analysis of system performance over time.

In some aspects, the architecture of the carbon capture system 1800 may be configured to support data storage within one or a plurality of files or databases 1820, thereby enabling scalable and flexible data management that is capable of accommodating various data types and volumes. In some implementations, the controller board(s) 1830 may be communicatively coupled to or integrated with one or more databases 1835 or similar storage media comprising one or more of: a hard disk drive ("HDD"), a solid state drive ("SSD"), a SATA SSD, a NVMe SSD, a M.2 SSD, a PCIe SAD, an embedded multimedia card ("eMMC"), a universal flash storage ("UFS") device, a secure digital card ("SD card"), a microSD card, a CompactFlash card, a USB flash drive, an optical drive, a solid state hybrid device ("SSHD"), network attached storage ("NAS"), or an SAS drive, as non-limiting examples, wherein the databases 1835 may be configured to at least temporarily store data received from one or more sensing devices 1840 (or sensors), as a non-limiting example.

In some embodiments, the carbon capture system 1800 may be configured to execute, perform, or implement one or more types of data processing 1825 upon at least a portion of the data within the system 1800. By way of example and not limitation, the carbon capture system 1800 may be configured to tokenize one or more portions of the data, such as, for example and not limitation, one or more carbon credits, or to configure one or more portions of the data for blockchain storage, or one or more "Web 3.0" integrations, as non-limiting examples.

Figure 19:
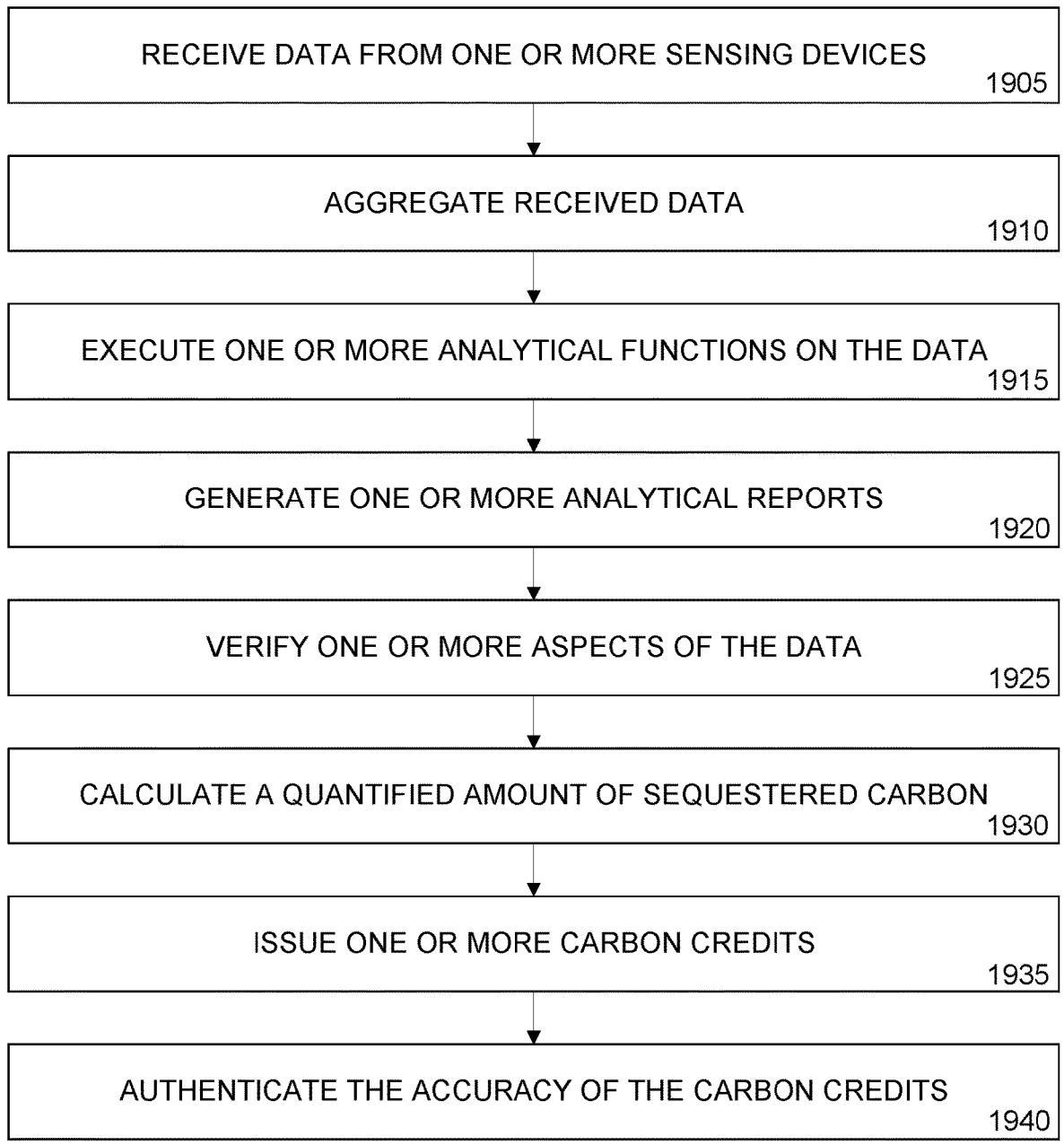
FIG. 19 illustrates exemplary method steps for a process for managing carbon capture, according to some embodiments of the present disclosure.

Referring now to FIG. 19, exemplary method steps for a process 1900 for managing carbon capture, according to some embodiments of the present disclosure, are illustrated. In some aspects, process 1900 may be at least partially performed using at least one carbon capture adapter and/or a carbon capture system that comprises at least one controller board communicatively coupled to one or more sensing devices or IoT devices. In some implementations, at 1905, data may be received from one or more sensing devices. By way of example and not limitation, the received sensing device data may comprise data pertaining to carbon emissions associated with one or more processes, operations, machines, apparatuses, or devices, or data associated with the functioning, operation, or performance of one or more carbon reduction or offsetting methodologies or devices, such as, for example and not limitation, the functioning of one or more carbon capture adapters. In some non-limiting exemplary embodiments, the sensing device data may be received in substantially real time.

In some aspects, at 1910, the received data may be aggregated, such that at 1915 one or more operations or calculations may be performed on the data to measure one or more aspects of the data or execute one or more analytical functions on the data. By way of example and not limitation, carbon emission data may be compared to decarbonization data to determine a quantified carbon offset for a project, system, machine, process, or apparatus. In some implementations, at 1920, one or more analytical reports may be generated to compile one or more portions of the assessed data in one or more structured formats. In some embodiments, at 1925, one or more aspects of the data may be verified. In some non-limiting exemplary embodiments, one or more third-party verification systems may be at least temporarily integrated with a carbon capture system to verify one or more carbon removal credits.

In some implementations, at 1930, a quantified amount of carbon sequestered by a at least one carbon reduction methodology, such as, for example and not limitation, a carbon capture adapter, may be calculated using one or more science-based methods or formulas based at least partially on the received data. In some aspects, the calculations may be performed in substantially real time as the data is received. In some non-limiting exemplary embodiments, at 1935, one or more carbon credits may be issued or one or more issues carbon credits may be tokenized, wherein issuance of the carbon credits may be based at least partially on the amount of sequestered carbon. In some aspects, at 1940, data may be retrieved from one or more third-party registries integrated with the carbon capture system to authenticate the accuracy of one or more aspects of one or more issued carbon credits by comparing the registry data to the carbon credit data.

In some embodiments, data gathered by and during process 1900 may be structured and stored in transactional format compatible with one or more time series databases. In some aspects, the process 1900 may be configured to integrate blockchain technology to generate an immutable decentralized ledger of carbon removal activities, carbon credit certificates issued, and carbon credit chain of custody to facilitate transparency and security.

In some implementations, process 1900 may be at least partially implemented to facilitate the establishment of a carbon miner system and process, wherein carbon capture equipment, such as, for example and not limitation, one or more carbon capture adapters, may be set up, installed, or otherwise configured for use and connected to at least one network or platform configured to assign one or more carbon removal jobs or tasks. In some aspects, upon retrieving and successfully fulfilling one or more carbon removal jobs to remove a targeted amount of carbon from the atmosphere, one or more proofs or shares of the successful carbon removal may be submitted to one or more carbon credit systems, wherein the proofs or shares may, in some non-limiting exemplary embodiments, be verified by one or more third-party systems.

In some aspects, data retrieved from the sensing devices by the process 1900 may be transmitted to at least one controller board, which may be configured to direct data storage within one or more time series databases and then to at least one relational database management system. In some implementations, the stored data may be blockchain-ready, thereby enabling tokenization of the carbon data and facilitating credibility and immutability. In some implementations, tokenized carbon credits may be configured to be traded or exchanged on one or more decentralized exchanges.

Figure 20:
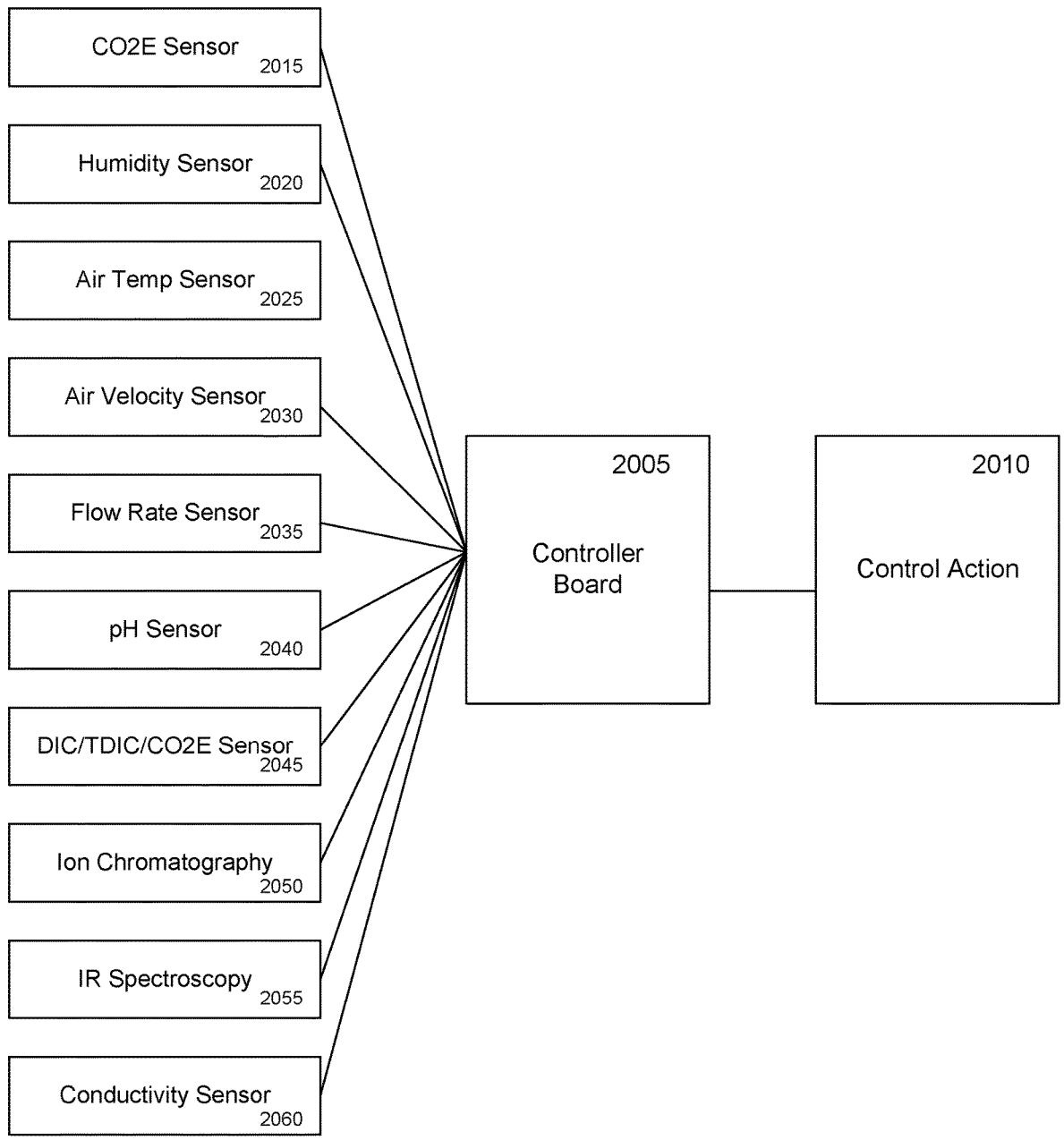
FIG. 20 illustrates a block diagram of an exemplary controller board configured for use within a carbon capture system, according to some embodiments of the present disclosure.

Referring now to FIG. 20, a block diagram of an exemplary controller board 2005 configured for use within a carbon capture system 2000, according to some embodiments of the present disclosure, is illustrated. In some embodiments, the controller board 2005 may be configured to receive data from one or more sensing devices 2015, 2020, 2025, 2030, 2035, 2040, 2045, 2050, 2055, 2060. By way of example and not limitation, data received by the controller board 2005 may be transmitted to one or more servers of a carbon capture system 2000, wherein the system architecture of the carbon capture system 2000 may be substantially similar to the system architecture of the carbon capture system 1800 shown in FIG. 18. In some implementations, the sensing devices 2015, 2020, 2025, 2030, 2035, 2040, 2045, 2050, 2055, 2060 may comprise one or more of: a CO2E sensing device r 2015, a humidity sensing device 2020, an air temperature sensing device 2025, an air velocity sensing device 2030, a flow rate sensing device, 2035, a pH sensing device 2040, a DIC/TDIC/CO2E sensing device 2045, an ion chromatography sensing device 2050, an IR spectroscopy sensing device 2055, or a conductivity sensing device 2060, as non-limiting examples. In some aspects, the controller board 2005 may be configured to initiate at least one control action 2010. By way of example and not limitation, the controller board 2005 may configure the control action 2010 to adjust one or more aspects of the carbon capture system 2000 based at least partially on data received from one or more of the sensing devices 2015, 2020, 2025, 2030, 2035, 2040, 2045, 2050, 2055, 2060.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, re-ordering, recirculating, multitasking and parallel processing may be advantageous.

Moreover, the separation of various system components in the embodiments described above should not be understood as requiring such separation in all embodiments, and it should be understood that the described program components and systems can generally be integrated together in a single operational unit, software product or packaged into multiple software products or CCS products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various 10 modifications may be made without departing from the spirit and scope of the claimed disclosure.

What is claimed is:

1. A method for capturing carbon, comprising:
receiving airflow comprising an amount of air;
directing the air to a first container portion of a carbon capture adapter, wherein the first container portion comprises an amount of at least one aqueous solution; and
directing the air within the first container portion through at least one Venturi tube to introduce the air to the at least one aqueous solution, wherein the at least one Venturi tube facilities aeration of the at least one aqueous solution by the air.

2. The method of claim 1, wherein receipt of the airflow is facilitating by at least one air movement device.

3. The method of claim 1, further comprising:
circulating the at least one aqueous solution via an applied amount of centrifugal force;
extracting an outer portion of the circulated at least one aqueous solution; and
directing the outer portion of the circulated at least one aqueous solution to at least one carbon sink.

4. The method of claim 3, wherein the outer portion of the at least one aqueous solution is extracted by at least one hydrocyclone separator.

5. The method of claim 1, further comprising:
pulling the received air through at least one cyclone separator to facilitate removal of one or more particles from the air.

6. The method of claim 1, further comprising:
directing the air through at least one mechanical filtering mechanism.

7. The method of claim 6, wherein the at least one mechanical filtering mechanism comprises a high efficiency particulate air filter.

8. The method of claim 3, further comprising:
directing an internal portion of the circulated at least one aqueous solution to a second container portion of the carbon capture adapter.

9. The method of claim 8, wherein the internal portion of the circulated at least one aqueous solution is directed to the second container portion by one or more sprayers.

10. The method of claim 8, wherein the second container portion comprises at least one wet scrubber.

11. The method of claim 3, wherein the outer portion of the circulated at least one aqueous solution is directed to the at least one carbon sink through one or more of: at least one mist eliminator or at least one adsorption filtering mechanism.

12. The method of claim 3, further comprising:
applying an amount of electricity to the at least one aqueous solution to facilitate at least one electrochemical reaction within the at least one aqueous solution.

13. The method of claim 12, wherein the amount of electricity is received from at least one electrochemical cell.

14. The method of claim 12, wherein the at least one electrochemical reaction enhances a carbon binding process facilitated by the at least one aqueous solution.

15. A method for capturing carbon, comprising:
receiving airflow comprising an amount of air;
directing the air to a first container portion of a carbon capture adapter, wherein the first container portion comprises an amount of at least one aqueous solution;
directing the air within the first container portion through at least one Venturi tube to introduce the air to the at least one aqueous solution, wherein the at least one Venturi tube facilities aeration of the at least one aqueous solution by the air;
circulating the at least one aqueous solution via an applied amount of centrifugal force;
extracting an outer portion of the circulated at least one aqueous solution;
directing the outer portion of the circulated at least one aqueous solution to at least one carbon sink;
directing an internal portion of the circulated at least one aqueous solution to a second container portion of the carbon capture adapter; and
exposing the outer portion of the circulated at least one aqueous solution to one or more high-pressure homogenizers.

* * * * *